(12) United States Patent
Takagi et al.

(10) Patent No.: US 10,154,647 B2
(45) Date of Patent: Dec. 18, 2018

(54) TOILET FOR ANIMAL

(71) Applicant: UNICHARM CORPORATION, Ehime (JP)

(72) Inventors: Chiyo Takagi, Kagawa (JP); Shinya Kaneko, Kagawa (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 14/780,243

(22) PCT Filed: May 19, 2015

(86) PCT No.: PCT/JP2015/064254
§ 371 (c)(1),
(2) Date: Sep. 25, 2015

(87) PCT Pub. No.: WO2016/139821
PCT Pub. Date: Sep. 9, 2016

(65) Prior Publication Data
US 2018/0192608 A1     Jul. 12, 2018

(30) Foreign Application Priority Data
Mar. 2, 2015   (JP) .................. 2015-040210

(51) Int. Cl.
*A01K 1/01* (2006.01)
*A01K 23/00* (2006.01)

(52) U.S. Cl.
CPC .............. *A01K 1/0114* (2013.01); *A01K 1/01* (2013.01); *A01K 1/0107* (2013.01); *A01K 23/00* (2013.01)

(58) Field of Classification Search
CPC ...... A01K 1/11; A01K 1/0107; A01K 1/0114; A01K 1/0117; A01K 1/0157
(Continued)

(56) References Cited

U.S. PATENT DOCUMENTS 4,784,082 A * 11/1988 Wolfe .................. A01K 1/0107
119/167
4,870,924 A * 10/1989 Wolfe .................. A01K 1/0107
119/167
(Continued)

FOREIGN PATENT DOCUMENTS

JP         2007-124 A     1/2007
JP     2010-200613 A     9/2010
(Continued)

OTHER PUBLICATIONS

International Preliminary Report on Patentability and Written Opinion from corresponding PCT application No. PCT/JP2015/064256 dated Sep. 5, 2017 (8 pgs).
(Continued)

*Primary Examiner* — Kathleen I Alker
*Assistant Examiner* — Danielle A Clerkley
(74) *Attorney, Agent, or Firm* — Brinks Gilson & Lione

(57) ABSTRACT

An animal toilet has a lengthwise direction, a horizontal direction and an up-down direction that are orthogonal to each other. The animal toilet is provided with an upper container that is provided with a plurality of holes through which urine passes below, a lower container that is positioned below the upper container and has formed an insert hole on a front face along the lengthwise direction, a tray that is housed from the insert hole into the lower container in a manner being allowed to be pulled out forward, and an absorbent sheet that is placed on a bottom face of the tray and receives and absorbs the urine that falls through the holes of the upper container. The tray includes a pair of horizontal walls being provided along the horizontal direction and standing upward from the bottom face at both lengthwise ends, and a pair of lengthwise walls being provided along the lengthwise direction and standing upward from the bottom face at both horizontal ends, in (Continued)

order to section a placing area of the absorbent sheet. A horizontal wall displaced part, having the horizontal wall displaced outward along the lengthwise direction, is formed at a horizontal end part of the horizontal wall and a lengthwise wall displaced part, having the lengthwise wall displaced outward along the horizontal direction, is formed at a lengthwise end part of the lengthwise wall, in a manner corresponding to at least one corner part of four corner parts of the placing area.

20 Claims, 15 Drawing Sheets

(58) Field of Classification Search
USPC .......................................... 119/161, 165–170
See application file for complete search history.

(56) References Cited

U.S. PATENT DOCUMENTS

| | | | | |
|---|---|---|---|---|
| 5,144,914 A | * | 9/1992 | Giannakopoulos | A01K 1/0107 119/168 |
| 5,755,182 A | * | 5/1998 | Brown, Jr. | A01K 1/0114 119/165 |
| 6,039,003 A | * | 3/2000 | Cox | A01K 1/011 119/166 |

FOREIGN PATENT DOCUMENTS

| JP | 2011-4664 A | 1/2011 |
|---|---|---|
| JP | 2012-175910 A | 9/2012 |
| JP | 2013-17446 A | 1/2013 |

OTHER PUBLICATIONS

International Search Report PCT/ISA/237 from corresponding PCT application No. PCT/JP2015/064254 dated Jun. 16, 2015.
Kao and Nyan Nyan, Aug. 4, 2011, "CAT System tire comparison and validation", obtained at the internet address: http://www.nekohon.jp/litter/system-iris.html.
"1 Shukan Torikae Irazu Neko Toire", Neko Yo System Toire No Hikaku to Kensho, Jan. 23, 2013 (Jan. 23, 2013), pp. 1-4, XP055436299, http://www.nekohon.jp/litter/system-iris.htm.
European Search Report from corresponding European application No. 15883988.6, dated May 7, 2018 (7 pages).

\* cited by examiner

ENLARGED VIEW OF PART B

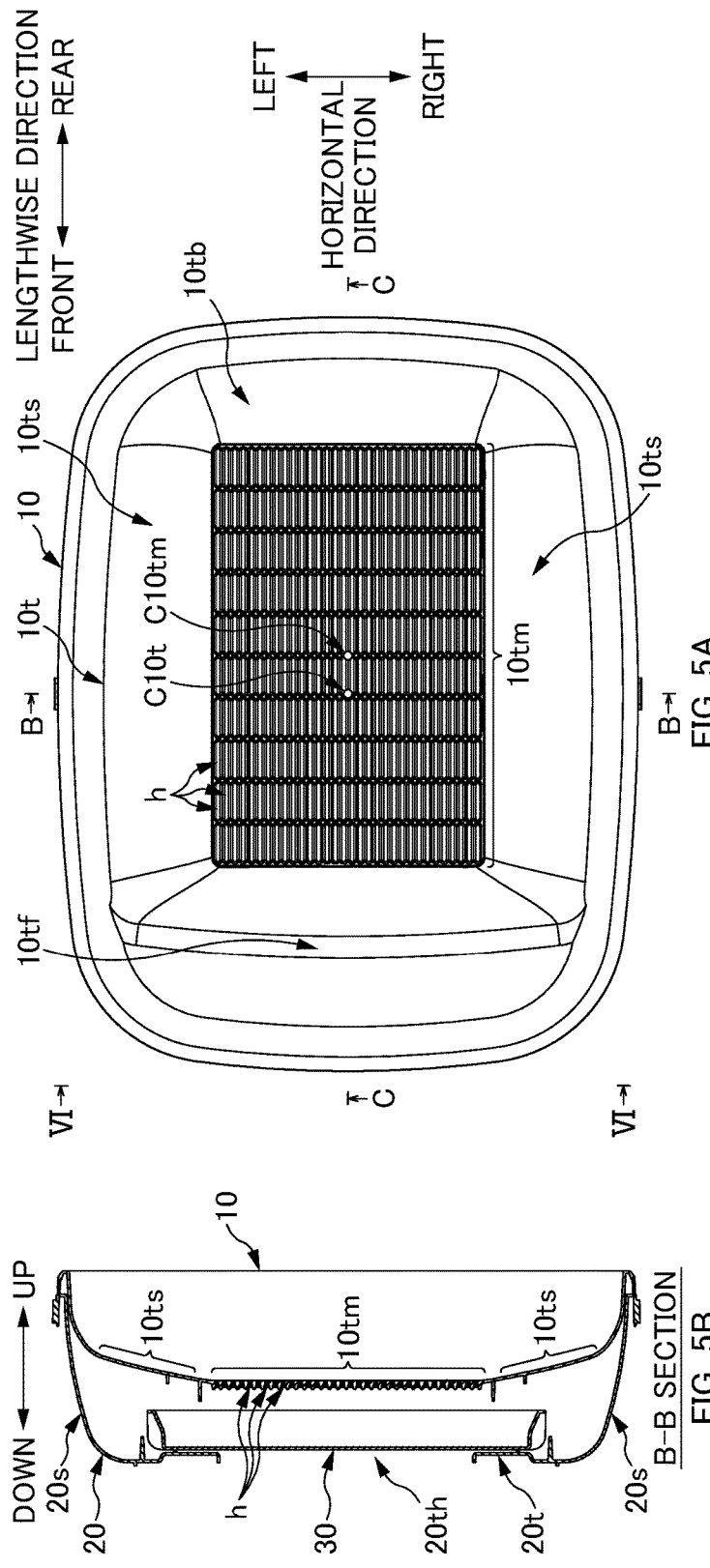
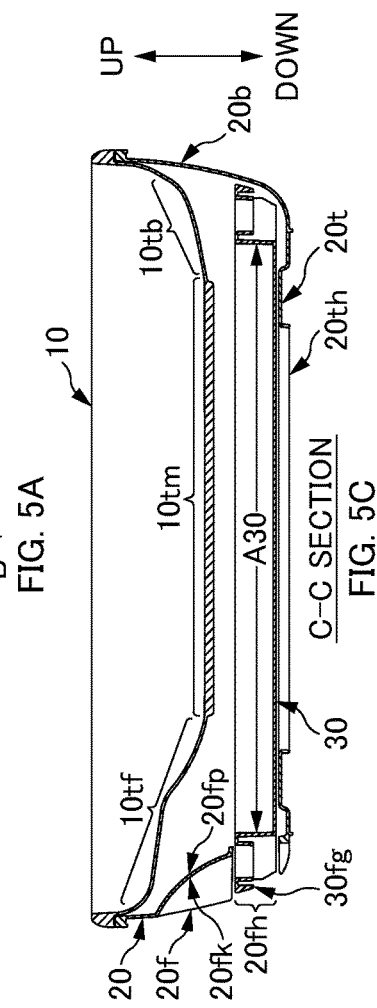

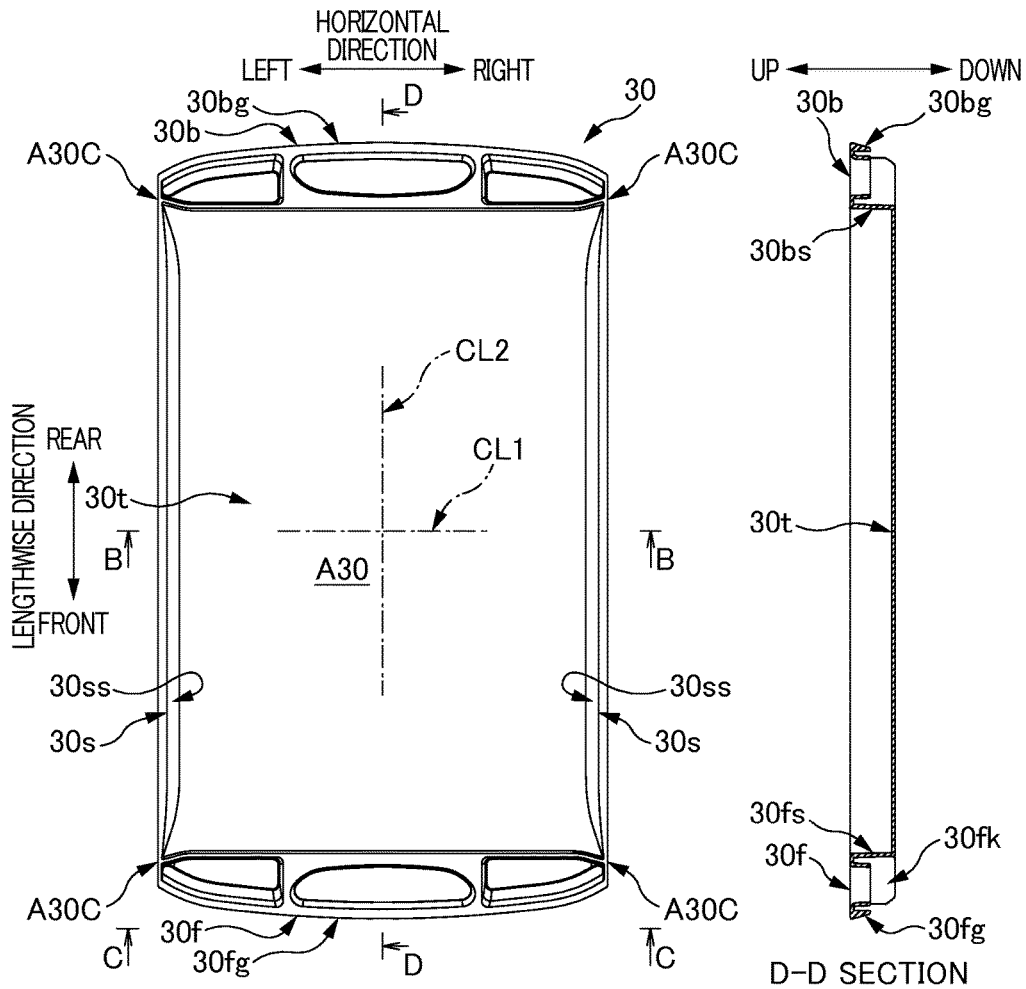
FIG. 7A
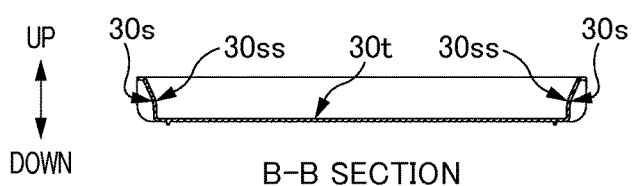
B-B SECTION
FIG. 7B
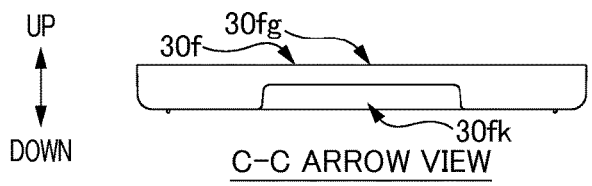
C-C ARROW VIEW
FIG. 7C
FIG. 7D

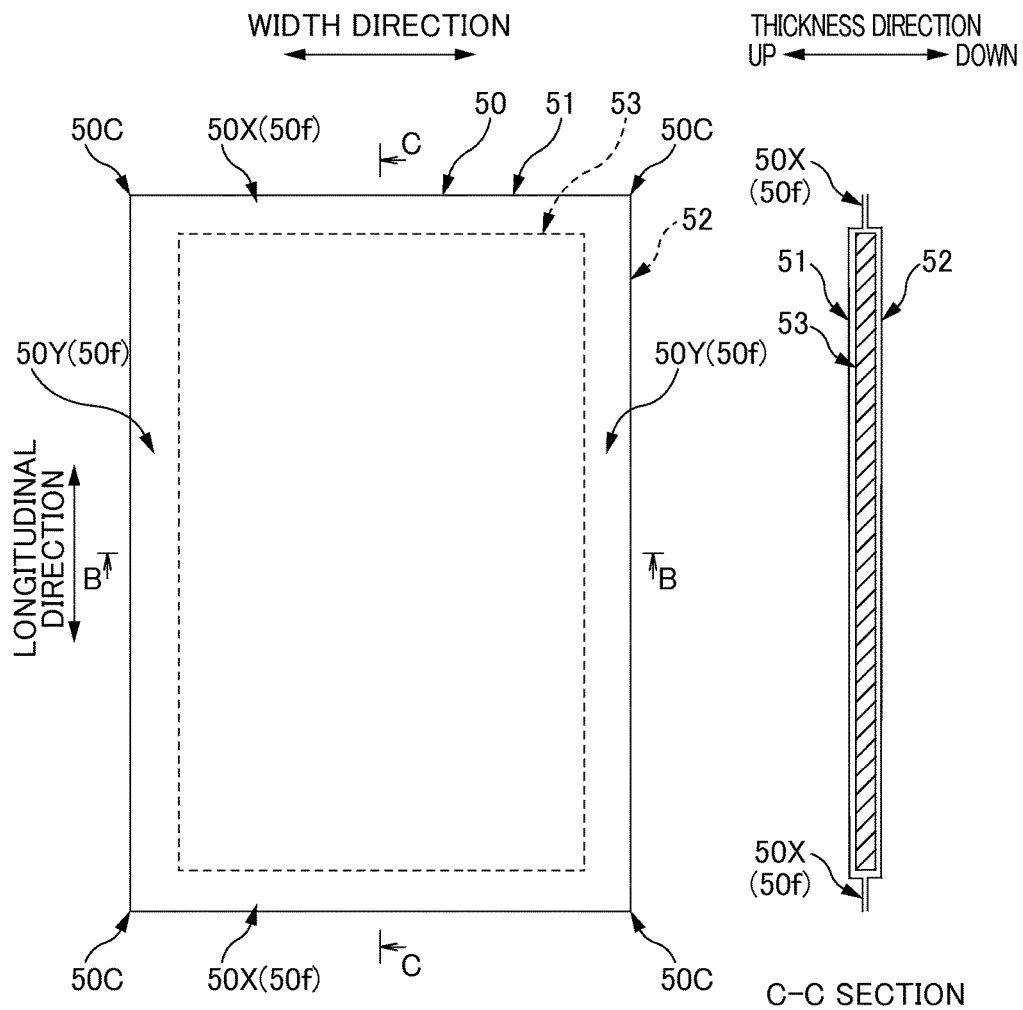
FIG. 9A
FIG. 9C C-C SECTION
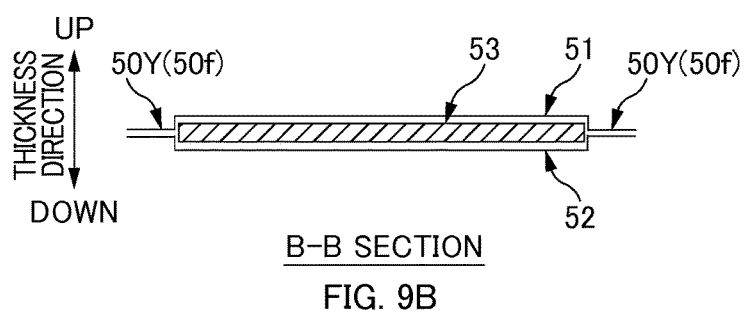
FIG. 9B B-B SECTION

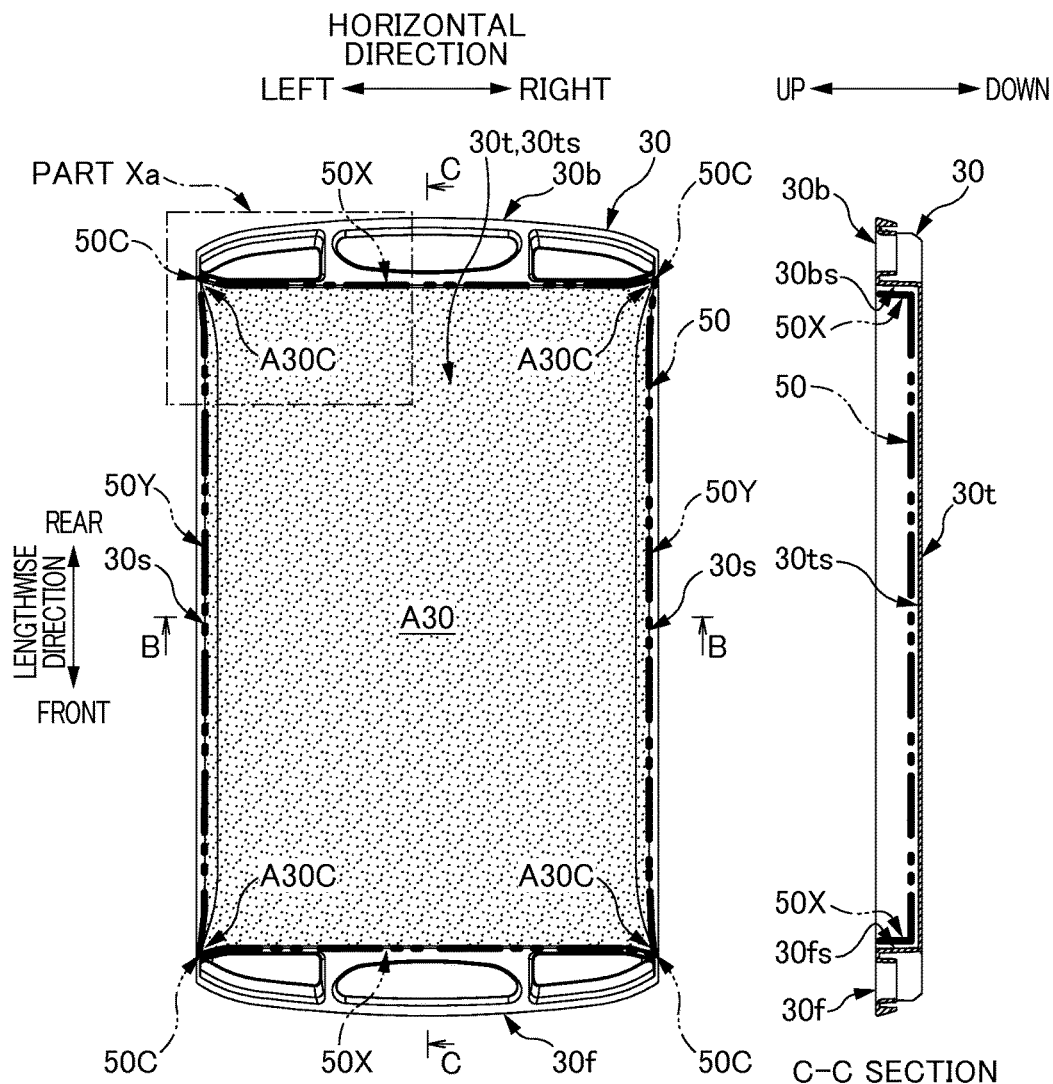
FIG. 10A
FIG. 10C
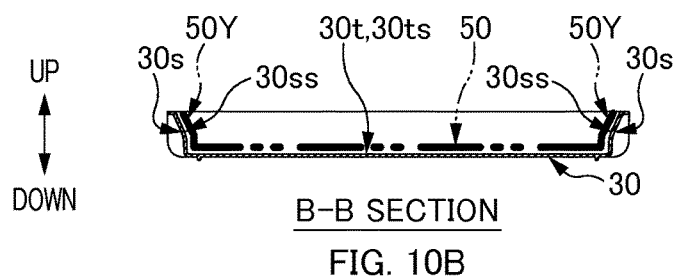
B-B SECTION
FIG. 10B

ENLARGED VIEW OF PART Xa

B-B SECTION

C-C SECTION

TOILET FOR ANIMAL

RELATED APPLICATION

The present application is a 35 U.S.C. § 371 national stage filing of International Patent Application No. PCT/JP2015/064254, filed May 19, 2015, to which priority is claimed under 35 U.S.C. § 120 and through which priority is claimed under 35 U.S.C. § 119 to Japanese Priority Patent Application No. 2015-040210, filed Mar. 2, 2015.

TECHNICAL FIELD

The present invention relates to toilets for animals which are used by animals such as cats.

BACKGROUND ART

An animal toilet 101 which is used by animals such as cats is conventionally known. This animal toilet 101 includes, as illustrated in FIG. 1, the lengthwise direction, the horizontal direction and the up-down direction as the three directions which are orthogonal to each other. Further, this animal toilet 101 is provided with an upper container 110 which has provided a plurality of holes h, h . . . through which urine passes through below, a lower container 120 which is positioned below the upper container 110 and has formed an insert hole 120fh on the front face 120f at the lengthwise end side, and a tray 130 which is housed in the lower container 120 from the above insert hole 120fh in a manner allowed to be pulled out in the lengthwise direction. And as illustrated in FIG. 2A, the bottom face 130ts of the tray 130 has placed an absorbent sheet 50 which receives and absorbs urine that has fallen through the above described holes h, h . . . of the upper container 110. Therefore, the tray 130 is pulled out forward by a worker such as the owner of the animal to change the used absorbent sheet 50 in this tray 130 to a new absorbent sheet 50.

CITATION LIST

Patent Literature

[PTL 1] Japanese Laid-open Application No. 2013-17446

SUMMARY OF INVENTION

Technical Problem

This tray 130 includes a pair of horizontal walls 130f, 130b provided along the horizontal direction on the two sides at the lengthwise ends in a manner standing upward from the above described bottom face 130ts and a pair of lengthwise walls 130s, 130s provided along the lengthwise direction on the two sides at the horizontal ends in a manner standing upward from the above described bottom face 130ts, in order to section the placing area A130 for the absorbent sheet 50.

Meanwhile, the absorbent sheet 50 is in a rectangular shape when seen in a planar view including, for example, a pair of horizontal side parts 50X, 50X and a pair of lengthwise side parts 50Y, 50Y as well as including corner parts 50C, 50C . . . at the four corners. And when this absorbent sheet 50 is placed on the above placing area A130, the horizontal side parts 50X, 50X and the lengthwise side parts 50Y, 50Y of this sheet 50 are each bended upward to stand by being made to come up along the inner wall faces 130fs, 130bs of the respective horizontal walls 130f, 130b and the inner wall faces 130ss, 130ss of the respective lengthwise walls 130s, 130s of the tray.

However, as illustrated in the enlarged view of part B in FIG. 2B, the corner part 50C where the horizontal side part 50X joins the lengthwise side part 50Y would have this corner part 50C bent from both horizontal and lengthwise directions so that hereby this corner part 50C would be excessively raised. And as a result, this corner part 50C would protrude excessively upward compared to the section 50XN excluding the above corner part 50C in the horizontal side part 50X and the section 50YN excluding the above corner part 50C in the lengthwise side part 50Y of the absorbent sheet 50. For this reason, this corner part 50C would be caught on the insert hole 120fh and the like of the lower container 120 when the tray 130 is pulled out from the lower container 120 or when the tray 130 is pushed into the lower container 120 of FIG. 1, and as a result, a problem of the absorbent sheet 50 unintendedly moving relatively in the lengthwise direction with regard to the tray 130 may be caused.

The present invention has been made in view of the above circumstances and an objective thereof is to restrain the corner part of an absorbent sheet from excessively protruding out upward when this absorbent sheet is placed on a tray.

Solution to Problem

A main aspect of the invention for achieving the above objective is an animal toilet having a lengthwise direction, a horizontal direction and an up-down direction that intersect each other including:

an upper container that is provided with a plurality of holes through which urine passes below;

a lower container that is positioned below the upper container and has formed an insert hole on a front face along the lengthwise direction;

a tray that is housed from the insert hole into the lower container in a manner being allowed to be pulled out forward; and an absorbent sheet that is placed on a bottom face of the tray and receives and absorbs the urine that falls through the holes of the upper container, the tray including a pair of horizontal walls being provided along the horizontal direction and standing upward from the bottom face at both lengthwise ends, and a pair of lengthwise walls being provided along the lengthwise direction and standing upward from the bottom face at both horizontal ends, in order to section a placing area of the absorbent sheet, and a horizontal wall displaced part, having the horizontal wall displaced outward along the lengthwise direction, being formed at a horizontal end part of the horizontal wall and a lengthwise wall displaced part, having the lengthwise wall displaced outward along the horizontal direction, being formed at a lengthwise end part of the lengthwise wall, in a manner corresponding to at least one corner part of four corner parts of the placing area.

Other features of the present invention will be made clear through the present specification with reference to the accompanying drawings.

Advantageous Effects of Invention

According to the present invention, the corner part of an absorbent sheet can be restrained from excessively protruding out upward when this absorbent sheet is placed on a tray.

BRIEF DESCRIPTION OF THE DRAWINGS

FIG. 5A is a schematic planar view with a cover 40 taken off from the animal toilet 1.

FIG. 5B is a cross-sectional view taken along line B-B at the approximate center in FIG. 5A.

FIG. 5C is a lengthwise sectional view taken along line C-C at the approximate center in FIG. 5A.

FIG. 7A is a schematic planar view of a tray 30.

FIG. 7B is a schematic horizontal sectional view taken along line B-B at the approximate center in FIG. 7A.

FIG. 7C is a schematic front view in the direction of the arrows C-C in FIG. 7A.

FIG. 7D is a schematic lengthwise sectional view taken along line D-D at the approximate center in FIG. 7A.

FIG. 9A is a schematic planar view of the absorbent sheet 50.

FIG. 9B is a schematic horizontal sectional view taken along line B-B at the approximate center in FIG. 9A.

FIG. 9C is a schematic lengthwise sectional view taken along line C-C at the approximate center in FIG. 9A.

FIG. 10A is a schematic planar view illustrating a state where the absorbent sheet 50 is placed on the tray 30.

FIG. 10B is a schematic horizontal sectional view taken along line B-B at the approximate center in FIG. 10A.

FIG. 10C is a schematic lengthwise sectional view taken along line C-C at the approximate center in FIG. 10A.

DESCRIPTION OF EMBODIMENTS

Figure 1:
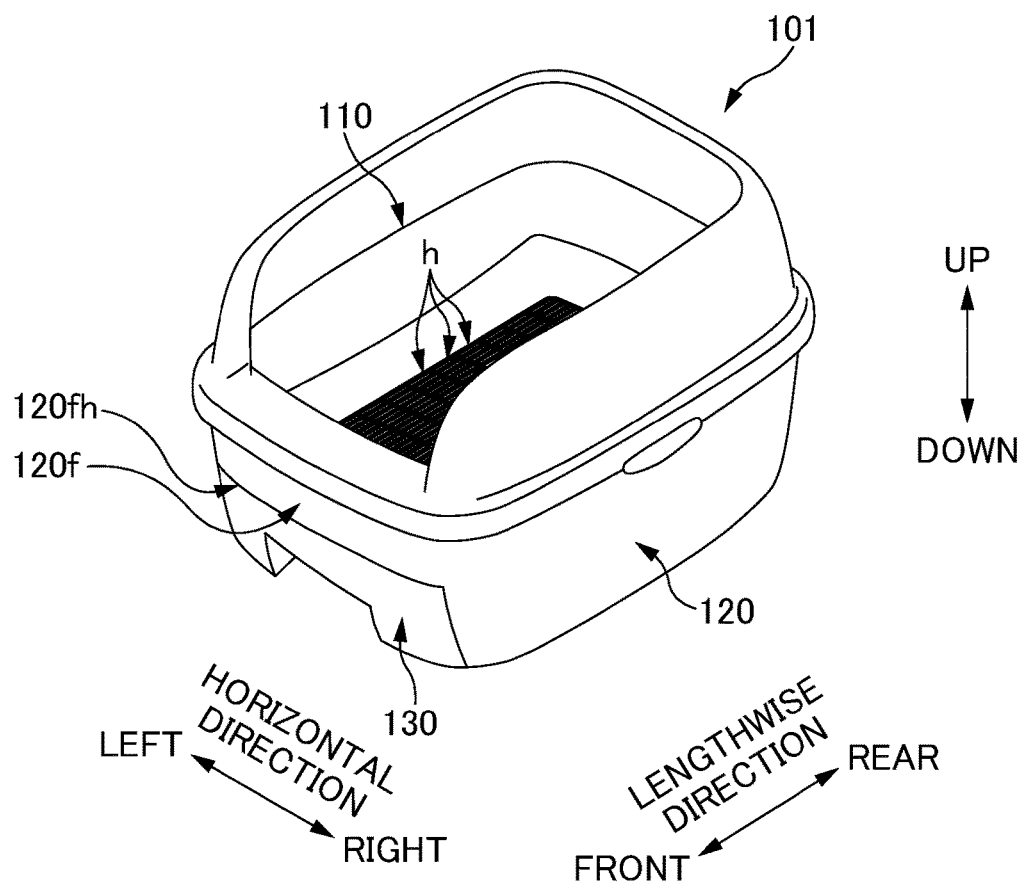
FIG. 1 is a schematic perspective view of an animal toilet 101.

At least the following matters will become clear through the description of the present specification and the accompanying drawings.

An animal toilet having a lengthwise direction, a horizontal direction and an up-down direction that intersect each other including:

an upper container that is provided with a plurality of holes through which urine passes below;

a lower container that is positioned below the upper container and has formed an insert hole on a front face along the lengthwise direction;

a tray that is housed from the insert hole into the lower container in a manner being allowed to be pulled out forward; and an absorbent sheet that is placed on a bottom face of the tray and receives and absorbs the urine that falls through the holes of the upper container, the tray including a pair of horizontal walls being provided along the horizontal direction and standing upward from the bottom face at both lengthwise ends, and a pair of lengthwise walls being provided along the lengthwise direction and standing upward from the bottom face at both horizontal ends, in order to section a placing area of the absorbent sheet, and a horizontal wall displaced part, having the horizontal wall displaced outward along the lengthwise direction, being formed at a horizontal end part of the horizontal wall and a lengthwise wall displaced part, having the lengthwise wall displaced outward along the horizontal direction, being formed at a lengthwise end part of the lengthwise wall, in a manner corresponding to at least one corner part of four corner parts of the placing area.

According to such an animal toilet, at least one corner part of the four corner parts of the above described placing area which is sectioned on the tray has the above described end part of the horizontal wall include a horizontal wall displaced part that is displaced outward along the lengthwise direction, and the above described end part of the lengthwise wall includes a lengthwise wall displaced part that is displaced outward along the horizontal direction. Therefore, when an absorbent sheet is placed on the tray, each bending action applied from both the horizontal and the lengthwise directions on a corner part of this sheet can be relieved by the above described horizontal wall displaced part and the lengthwise wall displaced part. And as a result, the corner part is restrained from excessively protruding out upward.

It is preferable that in the animal toilet, the horizontal wall displaced part is displaced outward along the lengthwise direction while approaching an outer side along the horizontal direction and the lengthwise wall displaced part is displaced outward along the horizontal direction while approaching an outer side along the lengthwise direction.

According to such an animal toilet, the horizontal wall displaced part is displaced to the outer side along the lengthwise direction while approaching the outer side in the horizontal direction, and the lengthwise wall displaced part is displaced to the outer side along the horizontal direction while approaching the outer side in the lengthwise direction. Therefore, the bending actions applied to the corner part of the absorbent sheet in both the horizontal and lengthwise directions can be smoothly relieved. And hereby, the standing of this corner part can be smoothly restrained so that as a result, this corner part can be quickly restrained from excessively protruding out upward.

It is preferable that in the animal toilet, a joining part of the horizontal wall displaced part with the lengthwise wall displaced part is positioned on an outer side along the lengthwise direction than a section of the horizontal wall excluding the horizontal wall displaced part as well as is positioned on an outer side along the horizontal direction than a section of the lengthwise wall excluding the lengthwise wall displaced part.

According to such an animal toilet, the above described restraining effect on the corner parts from protruding out upward can be further certainly achieved.

It is preferable that in the animal toilet, an inner wall face of the horizontal wall is inclined based on an inclination angle of the horizontal wall so that an upper part than a lower part along the up-down direction is positioned on an outer side along the lengthwise direction, an inner wall face of the lengthwise wall is inclined based on an inclination angle of the lengthwise wall so that an upper part than a lower part along the up-down direction is positioned on an outer side along the horizontal direction, and a maximum value of the inclination angle of the inner wall face of the horizontal wall is smaller than a maximum value of the inclination angle of the inner wall face of the lengthwise wall.

According to such an animal toilet, the inner wall face of the horizontal wall is in a state standing upright with respect to the inner wall face of the lengthwise wall. Thus this horizontal wall can effectively prevent the absorbent sheet from relatively moving in the lengthwise direction with respect to the tray due to the inertial force of the absorbent sheet itself when the tray is drawn out or the tray is pushed in.

It is preferable that in the animal toilet, the inclination angle at the horizontal wall displaced part is of a same value of the inclination angle at a horizontal center part of the horizontal wall.

According to such an animal toilet, the angle in which the inner wall face at the horizontal wall displaced part is inclined is of a value same as the angle in which the inner wall face at the horizontal center part of the horizontal wall so that the horizontal wall can be effective in restraining the relative movement of the absorbent sheet at the horizontal end parts similar to that at the horizontal center part. And hereby, the absorbent sheet can be effectively prevented from relatively moving in a direction toward the end part of the tray, in other words toward a direction between the lengthwise direction and the horizontal direction.

It is preferable that in the animal toilet, the tray has a shape that has a side that is longer along the lengthwise direction than a side along the horizontal direction, the tray can be housed in the lower container with either sides at the lengthwise ends facing a front, and the horizontal wall displaced part and the lengthwise wall displaced part are provided to all corner parts of all the four corner parts of the placing area.

According to such an animal toilet, the tray can be housed in the lower container from the insert hole when either of the two lengthwise end sides of the tray is directed toward the insert hole of the lower container. Therefore, the worker can be certainly kept from inserting the tray in the wrong direction.

Further, the horizontal wall displaced part and the lengthwise wall displaced part are provided to all four corner parts of the placing area in the tray so that the absorbent sheet can be prevented from excessively protruding out upward with respect to all four corners of the absorbent sheet. And hereby, the above described four corners can be certainly prevented from getting caught on the lower container when the tray is pulled out from the lower container or when the tray is pushed into the lower container. And as a result, the absorbent sheet can be certainly prevented from relatively moving in the lengthwise direction with respect to the tray.

It is preferable that in the animal toilet, the horizontal wall is displaced along an arc curve in a predetermined area including a position, of the horizontal wall displaced part, where a displacement toward an outer side along the lengthwise direction starts and the lengthwise wall is displaced along an arc curve in a predetermined area including a position, of the lengthwise wall displaced part, where a displacement toward an outer side along the horizontal direction starts.

According to such an animal toilet, the absorbent sheet can be smoothly shifted from the horizontal wall displaced part to its proximate parts at the horizontal wall and the absorbent sheet can be smoothly shifted from the lengthwise wall displaced part to its proximate parts at also the lengthwise wall, based on the displacement made along the arc curve at the above described each predetermined area. Therefore, the changes in the bending state of the absorbent sheet that may occur between the horizontal wall displaced part and its proximate parts can be made in continuous and smooth manners. And hereby, the absorbent sheet separating from the inner wall face of the horizontal wall and the absorbent sheet separating from the inner wall face of the lengthwise wall which may occur when these changes are large is restrained. As a result, this absorbent sheet can be made to certainly come into contact with the respective inner wall faces of the horizontal and the lengthwise walls.

It is preferable that in the animal toilet, a length of the lengthwise wall along the lengthwise direction is longer than a length of the horizontal wall along the horizontal direction, the absorbent sheet has a long side part that is along a longitudinal direction and a short side part that is along a width direction, the short side part having a length shorter than the long side part, and the absorbent sheet is placed on the tray with the longitudinal direction made to come along the lengthwise direction and the width direction made to come along the horizontal direction, and a length of the lengthwise wall displaced part in the lengthwise direction is longer than a length of the horizontal wall displaced part in the horizontal direction.

According to such an animal toilet, the long side part of the absorbent sheet is made to come along the lengthwise wall which is longer than the horizontal wall. And in this case, although the long side part of this absorbent sheet is likely to fall toward the inside (in a direction away from each corresponding wall) compared to the short side part, here, however, the length in the lengthwise direction of the lengthwise wall displaced part is made long. Therefore, the tendency of the above described long side part being likely to fall inside can be restrained. And for this reason, the long side part which is longer than the short side part of the absorbent sheet falling inside along the horizontal direction to overlay from above on the inner side section of this absorbent sheet can be prevented thereby preventing a large negative effect on the urine absorbency.

It is preferable that in the animal toilet, the joining part extends along a direction parallel to a direction orthogonal to a planar center position in the bottom face of the tray.

According to such an animal toilet, the direction in which the above described joining part extends is substantially orthogonal to the direction which is parallel with the bottom face of the tray. Therefore, this joining part can securely receive the absorbent sheet which relatively moves toward the corner part of the tray along the above described bottom face so that hereby the relative movement of the absorbent sheet toward the corner part of the tray can be effectively restricted.

It is preferable that in the animal toilet, a length of the lengthwise wall along the lengthwise direction is longer than a length of the horizontal wall along the horizontal direction, the absorbent sheet has a long side part that is along a longitudinal direction and a short side part that is along a width direction, the short side part having a length shorter than the long side part, and the absorbent sheet is placed on the tray with the longitudinal direction made to come along the lengthwise direction and the width direction made to come along the horizontal direction, the bottom face of the tray has a rectangular area when seen from above, the rectangular area is an area sectioned by two sets of sections of the horizontal walls excluding the horizontal wall displaced parts and extended lines extending from the sections of the horizontal walls excluding the horizontal wall displaced parts, and sections of the lengthwise walls excluding the lengthwise wall displaced parts and extended lines extending from the sections of the lengthwise walls excluding the lengthwise wall displaced parts, and the joining part is positioned closer to the lengthwise wall side than a diagonal line of the rectangular area.

According to such an animal toilet, the long side part of the absorbent sheet is made to come along the lengthwise wall which is longer than the horizontal wall. And in such case, although the long side part of the absorbent sheet is likely to fall toward the inside compared to the short side part, here, the above described joining part is positioned closer to the lengthwise wall than the above described diagonal line. Therefore, the tendency of the above described long side part being likely to fall toward the inside can be restrained. In other words, when the above described joining part is positioned closer to the horizontal wall than the diagonal line as described above, the long side part is likely to fall toward the inside along the horizontal direction than the short side part falling toward the inside along the lengthwise direction, and on the other hand, when the above described joining part is positioned closer to the lengthwise wall than the above described diagonal line, the short side part is likely to fall toward the inside along the lengthwise direction than the long side part falling toward the inside along the horizontal direction. And with regard to this, the latter positional relationship is adopted here. Therefore, the long side part of the absorbent sheet which is longer than the short side part thereof can be further prevented from falling toward the inside along the horizontal direction to overlay from above on the inner side section of the sheet. And hereby, a large negative effect on the urine absorbency can be prevented.

It is preferable that in the animal toilet, when an upper part of an edge part, positioned in the lower container, of the insert hole of the lower container is seen from above, a section corresponding to the corner part of the tray in the upper part has a section in a curved shape.

According to such an animal toilet, the section in the above described upper part of the edge part which corresponds to the corner part of the tray includes a curved section. Therefore, even if this section comes into contact with the above described corner part of the absorbent sheet when the tray is pulled out from the lower container, this section would gradually come into contact with this corner part. And hereby, the lengthwise external force which is applied to the absorbent sheet via the above described corner part by the above described upper part of the edge part of the insert hole can be relieved so that as a result, an unintended lengthwise relative movement of the absorbent sheet with respect to the tray can be restrained.

===Present Embodiment===

Figure 3:
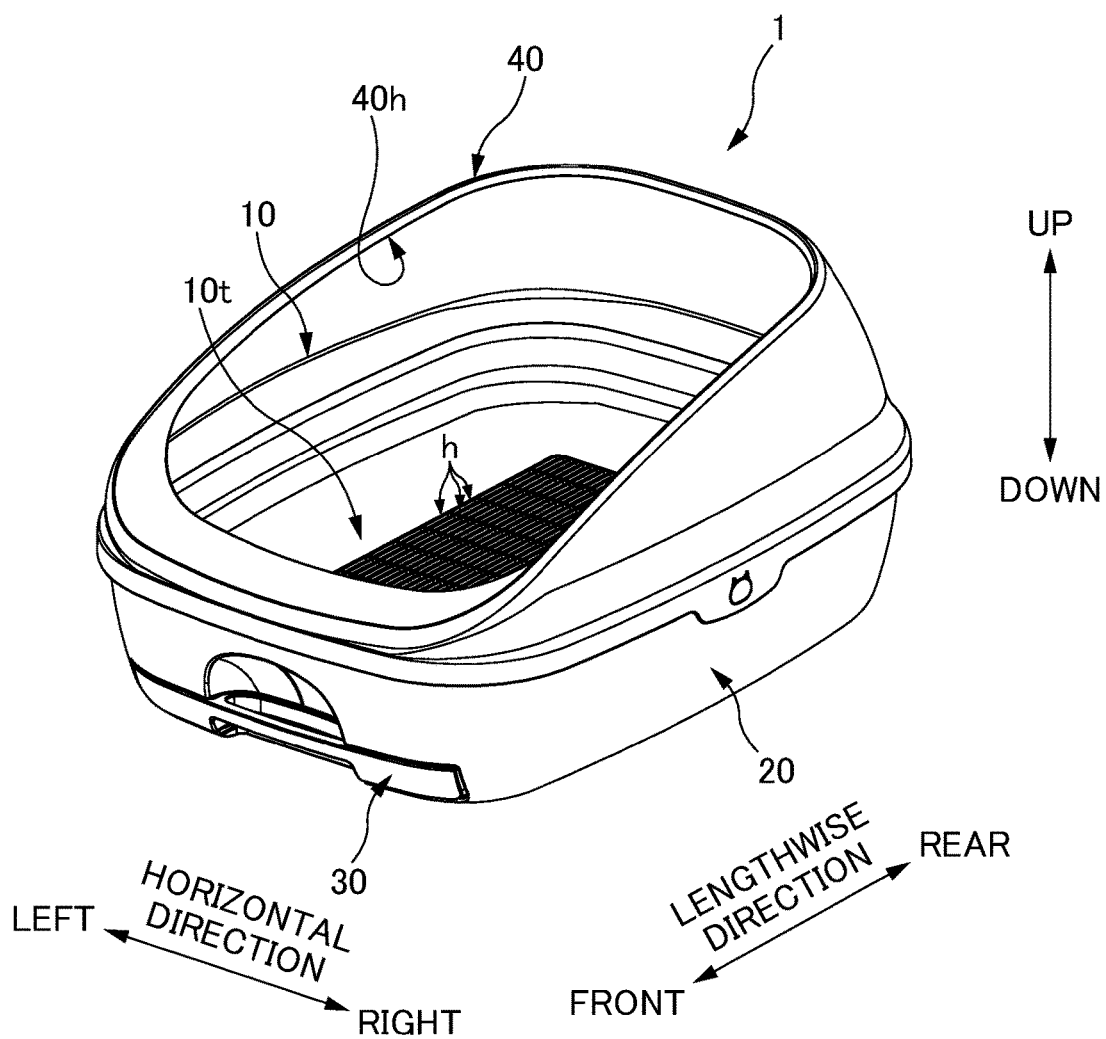
FIG. 3 is a schematic perspective view of the animal toilet 1 according to the present embodiment.
Figure 4:
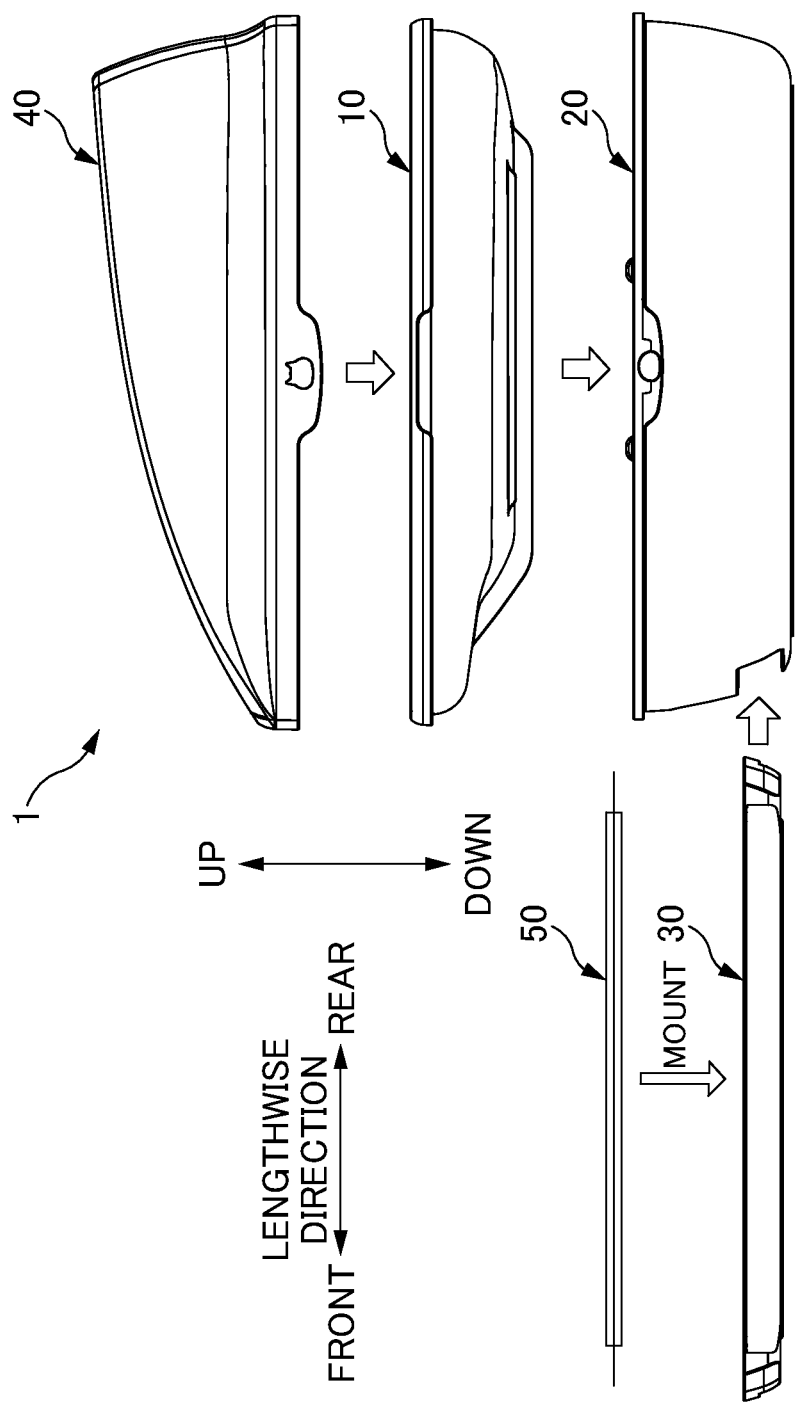
FIG. 4 is a schematic exploded side view of the animal toilet 1 according to the present embodiment.

FIG. 3 is a schematic perspective view of the animal toilet 1 according to the present embodiment. FIG. 4 is a exploded side view of the same animal toilet 1. Note that in the following description, the three directions that intersect each other are called the lengthwise direction, the horizontal direction and the up-down direction. Additionally, the lengthwise direction is also referred to as the "front-rear direction" and the horizontal direction is also referred to as the "right-left direction".

As illustrated in FIGS. 3 and 4, this animal toilet 1 is provided with an upper container 10, a lower container 20 placed under the upper container 10, a tray 30 which is housed in the lower container 20 in a manner allowed to be forwardly pulled out and a cover 40 placed over the upper container 10. And the bottom face part 10t of the upper container 10 has formed a plurality of through holes h, h . . . penetrating in the up-down direction and has placed particulate matters (not shown) such as cat litter on the bottom face part 10t as well.

Therefore, when an animal such as a cat gets on the particulate matters on the bottom face part 10t of the upper container 10 from the entrance/exit opening part 40h of the cover 40 and urinates, the urine falls through the spaces between the particulate matters and the above described through holes h, h . . . to be received by the tray 30 below so that the urine is stored in the tray 30. Note that, as illustrated in FIG. 4, this tray 30 has placed thereon an absorbent sheet 50 that absorbs liquid, for example, in a substantially rectangular planar shape and hereby the urine can be absorbed and certainly retained.

Description of the upper container 10, the lower container 20, the tray 30 and the absorbent sheet 50 will be given in the following.

FIG. 5A is a schematic planar view with the cover 40 taken off from the animal toilet 1, FIG. 5B is a horizontal sectional view taken along line B-B at the approximate center in FIG. 5A, and FIG. 5C is a lengthwise sectional view taken along line C-C at the approximate center in FIG. 5A. Additionally, FIG. 6 is a schematic front view in the direction of the arrows VI-VI in FIG. 5A.

The upper container 10 is for example a container which has a bottom but does not have a lid and the shape of the bottom face part 10t is in a substantially bowl form with the height of a predetermined area 10tm including the plane center position C10t thereof being low and the four surrounding areas 10tf, 10tb, 10ts, 10ts of the predetermined area 10tm being high. And the top face of this predetermined area 10tm is formed substantially flat and this area 10tm has the above described plurality of through holes h, h . . . each formed in oblong forms so that this predetermined area 10tm is made a mesh area 10tm allowing urine to pass through downward. By the way, in this example, the plane center position 10tm of the mesh area 10tm is shifted rearward with regard to the plane center position C10t of the bottom face part 10t of the upper container 10 and this mesh area 10tm of a low height basically has the above described particulate matters such as cat litter dispersedly placed, however, it is not limited to such.

The lower container 20 is also, for example, a container which has a bottom but does not have a lid. In other words, this lower container 20 includes a front wall 20f, a rear wall 20b, right and left side wall 20s, 20s and a bottom face wall 20t, and the front wall 20f, the rear wall 20b and the right and left side wall 20s, 20s are respectively arranged vertically upward from the front end edge, the rear end edge and the right and left side end edges of the bottom face wall 20t. However in this example, the bottom face wall 20t has a large substantially rectangular opening part 20th formed to penetrate in the up-down direction from the viewpoint of weight reduction, material cost reduction and the like, and hereby this lower container 20 is virtually a container without a bottom, however, it is not limited to such.

Figure 6:
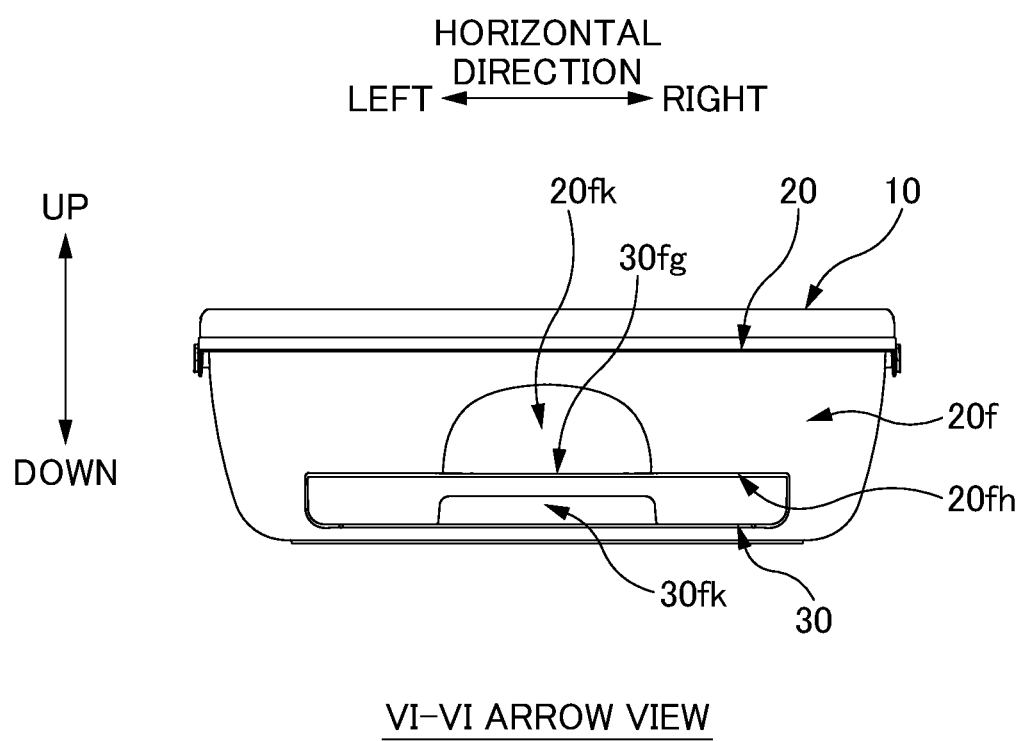
FIG. 6 is a schematic front view in the direction of the arrows VI-VI in FIG. 5A.

Further, as illustrated in FIGS. 5C and 6, the front wall 20f which forms the front face of the lower container 20, has a horizontally long insert hole 20fh formed to penetrate in the front-rear direction. And this insert hole 20fh has the above described tray 30 inserted from the front side and hereby the tray 30 is housed inside the lower container 20 in a manner allowed to be pulled out forward from the lower container 20.

Further, this front wall 20f has formed a concave face 20fk concaved rearward adjacent above the insert hole 20fh and hereby the later described handle part 30fg of the tray 30 is made easy to grasp from above.

Figure 8:
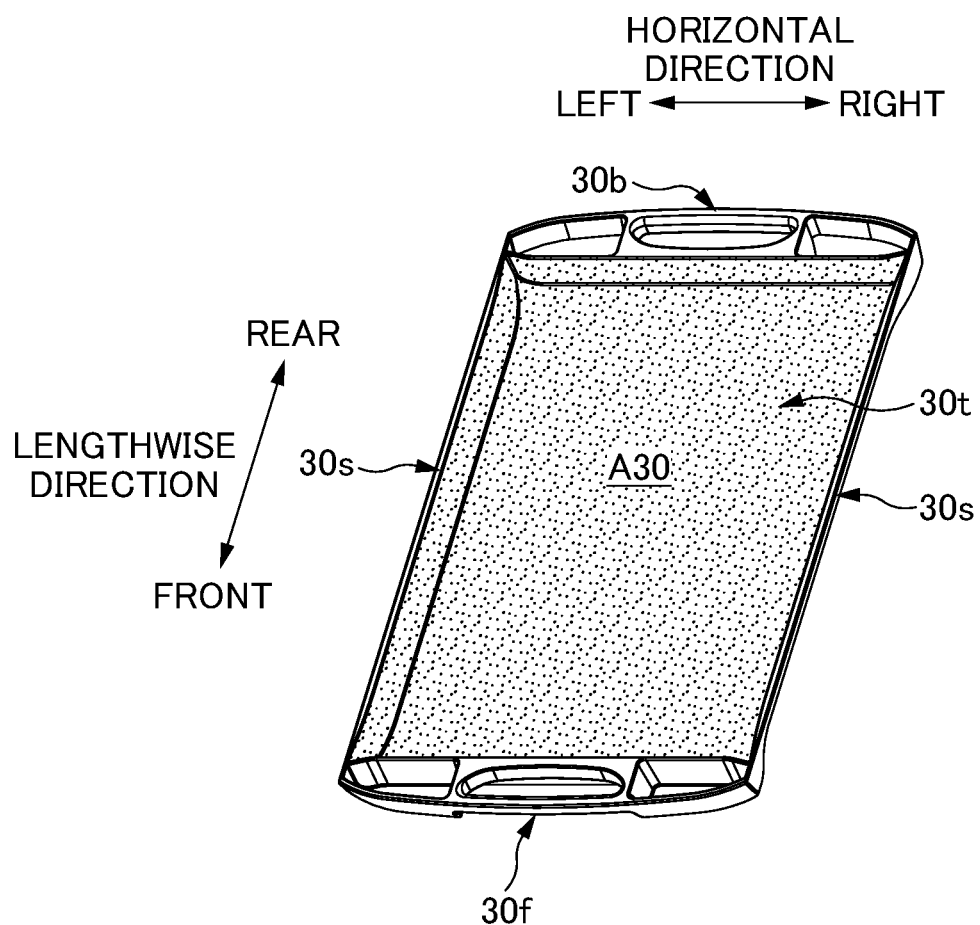
FIG. 8 is a schematic perspective view of the tray 30 seen from the top face side.

FIG. 7A is a schematic planar view of a tray 30. FIG. 7B is a schematic horizontal sectional view taken along line B-B at the approximate center in FIG. 7A, FIG. 7C is a schematic front view seen in the direction of the arrows C-C in FIG. 7A, and FIG. 7D is a lengthwise sectional view taken along line D-D at the approximate center in FIG. 7A. Additionally, FIG. 8 is a schematic perspective view of the tray 30 seen from the top face side.

As illustrated in FIGS. 7A to 7D and FIG. 8, the tray 30 is, for example, a shallow flat container which has a bottom but does not have a lid. In other words, the tray 30 includes a horizontally long front horizontal wall 30f which is located on the lengthwise front side and extends along the horizontal direction, a horizontally long rear horizontal wall 30b which is located on the lengthwise rear side and extends along the horizontal direction, a lengthwise long right lengthwise wall 30s which is located on the horizontal right side and extends in the lengthwise direction, a lengthwise long left lengthwise wall 30s which is located on the horizontal left side and extends in the lengthwise direction, and a bottom face wall 30t of a substantially rectangular shape which is longer in the lengthwise direction than the horizontal direction when seen in a planar view. And the front horizontal wall 30f, the rear horizontal wall 30b, the right and left lengthwise walls 30s, 30s are respectively arranged vertically upward from the front end edge, the rear end edge and the right and left side end edges of the bottom face wall 30t. And hereby, the tray 30 has sectioned thereon a placing area A30, in a substantially rectangular shape when seen in a planar view, for placing the absorbent sheet 50 (refer to the area A30 in a dotted pattern in FIGS. 8 and 10A). In other words, the absorbent sheet 50 is placed at a placing area A30 which is in an area A30 at or inside the inner wall face 30fs of the front horizontal wall 30f, the inner wall face 30bs of the rear horizontal wall 30b, and the inner wall faces 30ss, 30ss of the right and left side lengthwise walls 30s, 30s.

Meanwhile, the front horizontal wall 30f of the tray 30 has formed thereto a handle part 30fg for grasping when pulling the tray 30 out from the lower container 20. For example, in this embodiment, as illustrated in FIGS. 7C and 7D, the lower part in the front horizontal wall 30f has formed a recessed part 30fk which is recessed rearward and substantially rectangular when viewed from the front, and the section 30fg remaining above this recessed part 30fk functions as the handle part 30fg.

Further, as illustrated in FIGS. 7A, the shape of the tray 30 is line symmetry with respect to each of the lengthwise direction center line CL1 and the horizontal direction center line CL2. For example, the rear horizontal wall 30b also has provided thereto the handle part 30bg of a specification same at that of the above described handle part 30fg, so that the rear horizontal wall 30b and the front horizontal wall 30f are in shapes having mirror image relations with each other as well as these horizontal walls 30f, 30b are each dissymmetrical with each other in the right-left direction. Further, the lengthwise walls 30s, 30s on the right and left sides are also in shapes that are dissymmetrical with each other and these lengthwise walls 30s, 30s are in shapes that are dissymmetrical with each other in the front-rear direction.

Therefore, this tray 30 can be replaced in the front-rear direction. In other words, the tray 30 can be inserted from either the rear horizontal wall 30b or the front horizontal wall 30f with respect to the insert hole 20fh of the lower container 20 in FIG. 6. And hereby, the worker can be kept from inserting the tray 30 in the opposite direction by mistake.

However, it is not limited to such. For example, the shape of the tray 30 need not be line symmetry with respect to the lengthwise direction center line CL1 such as by omitting the handle part 30bg from the rear horizontal wall 30b, and similarly the shape of the tray 30 need not be line symmetry with respect to the horizontal direction center line CL2.

FIG. 9A is a schematic planar view of the absorbent sheet 50. Additionally, FIG. 9B is a schematic horizontal sectional view taken along line B-B at the approximate center in FIG. 9A and FIG. 9C is a schematic lengthwise sectional view taken along line C-C at the approximate center in FIG. 9A.

The absorbent sheet 50 is in, for example, a substantially rectangular shape when seen in a planar view having a longitudinal direction and a width direction (the direction having a length shorter than the longitudinal direction). Further, regarding the thickness direction which is orthogonal to the longitudinal direction and the width direction, this absorbent sheet 50 includes a liquid permeable top sheet 51, a liquid impermeable bottom sheet 52 which is arranged under the top sheet 51, and an absorbent body 53 which is inserted between the top sheet 51 and the bottom sheet 52 to absorb urine. And the planar sizes of these two sheets 51, 52 are made larger than the planar size of the absorbent body 53 so that hereby there are sections protruding out from the four sides of the absorbent body 53 for these sections protruding out to be joined by adhesion or thermal bonding and the like. In the following, the sections of these two sheets 51, 52 that come outside from the four sides of the absorbent body 53, in other words, the sections 50f where the absorbent body 53 does not exist in the absorbent sheet 50 is called the "flap parts 50f". By the way, the pair of long side parts 50Y, 50Y and the pair of the short side parts 50X, 50X which form the four sides of the planar shape of the absorbent sheet 50 are all substantially included in the flap parts 50f.

As an example of the absorbent body 53, there can be given an example where a liquid absorbent material made of pulp fiber, high absorbent polymer or the like is formed into a predetermined shape such as a rectangular shape when seen in a planar view, and nonwoven fabric and resin film and the like can be given as an example of the top sheet 51 and the bottom sheet 52, respectively. However, it is not limited to such and as long as they are materials having the functions given above, and such materials can be used appropriately.

FIG. 10A is a schematic planar view illustrating a state where this absorbent sheet 50 is placed on the tray 30. And FIG. 10B is a schematic horizontal sectional view taken along line B-B at the approximate center in FIG. 10A and FIG. 10C is a schematic lengthwise sectional view taken along line C-C at the approximate center in FIG. 10A. In these FIGS. 10A to 10C, the absorbent sheet 50 is indicated using chain double-dashed lines for the purpose of preventing confusion in the drawing.

As indicated in the chain double-dashed lines, the planar size of the absorbent sheet 50 is made in a size substantially corresponding to the placing area A30 (dotted pattern area) of the tray 30. In other words, this planar size is made in a size larger than the substantially flat bottom face 30*ts* of the bottom face wall 30*t* of the tray 30. To be specific, this planar size is made larger than the bottom face 30*ts* by substantially each of the inner wall faces 30*ss*, 30*ss* of the pair of the lengthwise walls 30*s*, 30*s* and each of the inner wall faces 30*fs*, 30*bs* of the pair of horizontal walls 30*f*, 30*b*. And when the absorbent sheet 50 is placed in the placing area A30, the longitudinal direction of the absorbent sheet 50 is aligned with the lengthwise direction and the width direction is aligned with the horizontal direction.

Therefore, as illustrated in FIG. 10B, the pair of the long side parts 50Y, 50Y of this absorbent sheet 50 come into contact from above with the inner wall faces 30*ss*, 30*ss* of the pair of the lengthwise walls 30*s*, 30*s*, respectively, of the tray 30 and as illustrated in FIG. 10C, the pair of the short side parts 50X, 50X of this sheet 50 come into contact from above with the inner wall faces 30*fs*, 30*bs* of the pair of horizontal walls 30*f*, 30*b*, respectively, of the tray 30. In other words, the pair of long side parts 50Y, 50Y and the pair of short side parts 50X, 50X of the absorbent sheet 50 respectively come up along the corresponding inner wall faces 30*ss*, 30*ss* of the lengthwise walls 30*s*, 30*s* and the inner wall faces 30*fs*, 30*bs* of the horizontal walls 30*f*, 30*b*. And as a result, each of the long side parts 50Y, 50Y and each of the short side parts 50X, 50X are respectively bended upward to come into a standing state.

Figure 2A:
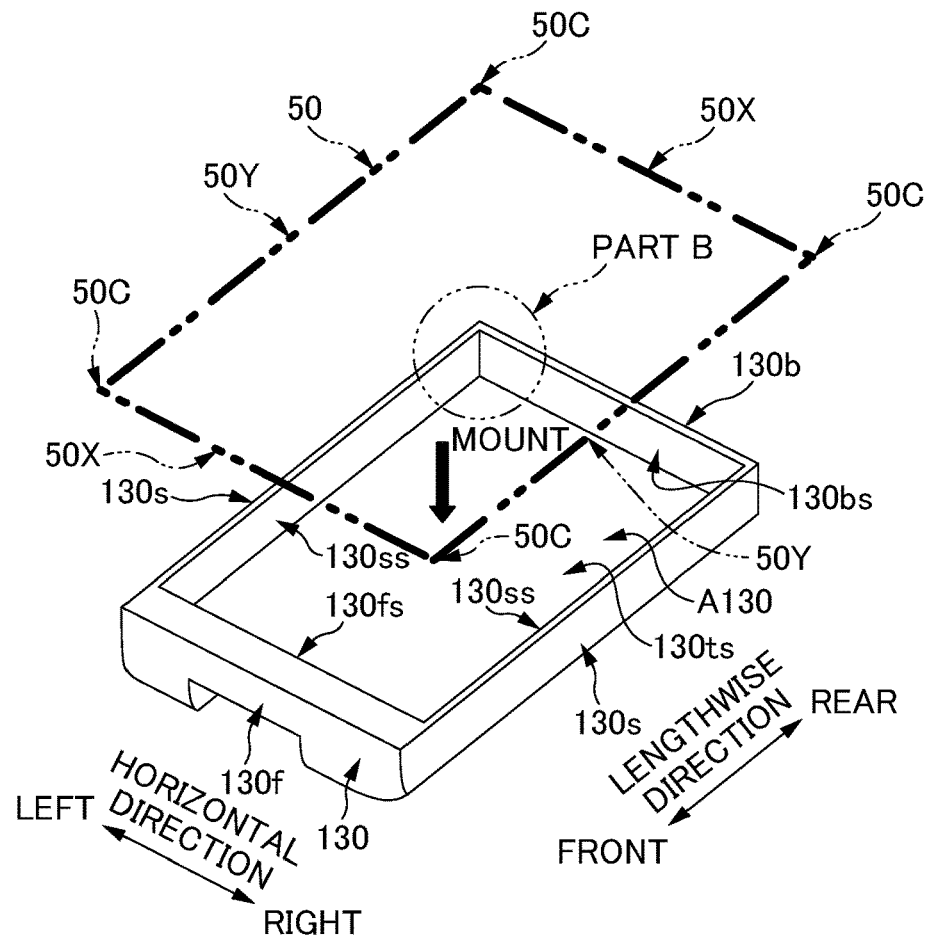
FIG. 2A is a schematic perspective view illustrating the manner in which an absorbent sheet 50 is placed on the tray 130.
Figure 2B:
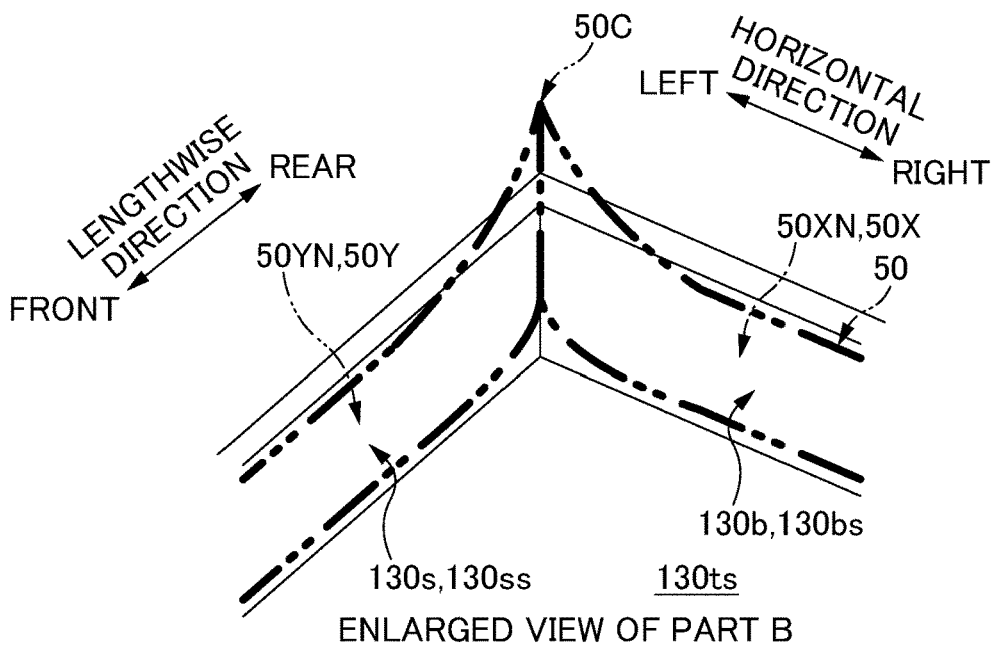
FIG. 2B is an enlarged view of part B in FIG. 2A.

However, at this time, a bending action is applied to each of the four corner parts 50C, 50C . . . of the absorbent sheet 50 from both the horizontal and the lengthwise directions so that each of the corner parts 50C, 50C . . . would protrude excessively upward, as illustrated in FIG. 2B. And as a result, the issue explained at first, that is, the problem of "the corner parts 50C, 50C . . . would be caught on the insert hole 120*fh* . . . when the tray 30 is pulled out from the lower container 20 or when the tray 30 is pushed into the lower container 20 and a problem of the absorbent sheet 50 unintendedly moving relatively in the lengthwise direction with regard to the tray 130 may be caused" may arise.

And so in the present embodiment, predetermined devises are made to the tray 30 in order to restrain these corner parts 50C from protruding outward. In the following, the devises are explained, and in the example of FIG. 10A, the devises are made to all the four corner parts A30C, A30C . . . in the above described placing area A30 on the tray 30, and the devises here are all have the same configuration. For such reason, explanation on one of the corner parts A30C will be given in the following. And here, the corner part A30C in the explanation is regarded as the corner part A30C which is formed by the rear horizontal wall 30*b* and the left side lengthwise wall 30*s* joining together (upper left corner part A30C in FIG. 10A). Additionally, the long side part 50Y of the absorbent sheet 50 is also called the "lengthwise side part 50Y" and the short side part 50X of the absorbent sheet 50 is also called the "horizontal side part 50X" in the following description.

Figure 11A:
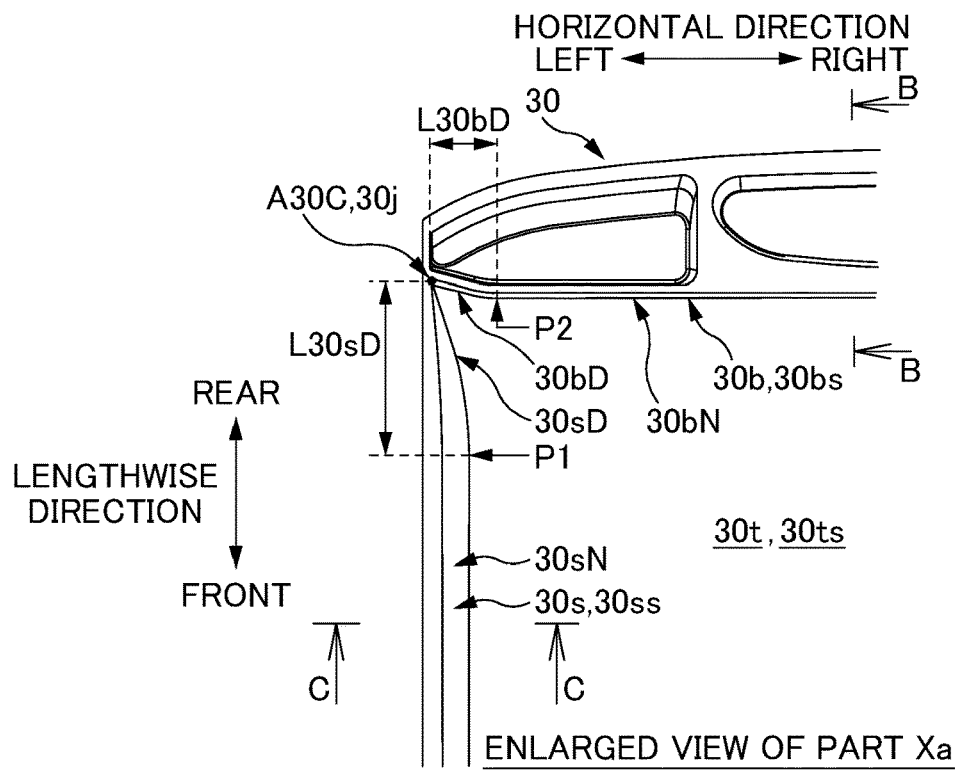
FIG. 11A is a schematic enlarged view of part Xa in FIG. 10A.
Figure 11B:
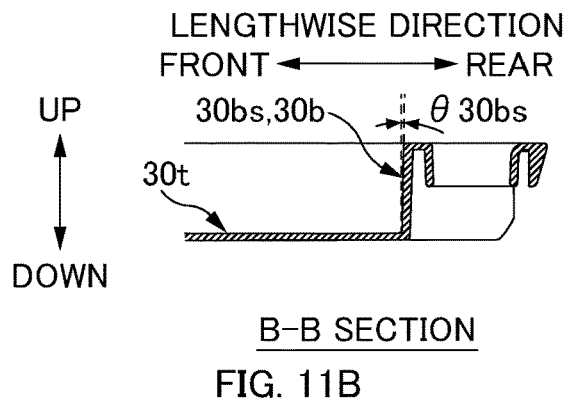
FIG. 11B is a sectional view taken along line B-B in FIG. 11A.
Figure 11C:
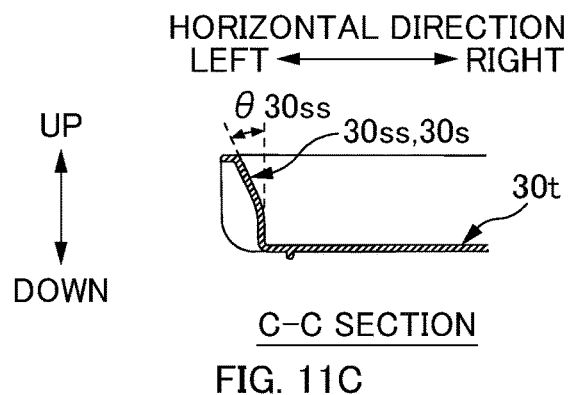
FIG. 11C is a sectional view taken along line C-C in FIG. 11A.

FIG. 11A is a schematic enlarged view of part Xa in FIG. 10A which illustrates the above described corner part A30C in an enlarged manner. Additionally, FIG. 11B is a sectional view taken along line B-B in FIG. 11A and FIG. 11C is a sectional view taken along line C-C in FIG. 11A. Furthermore, FIG. 12 is a schematic perspective view of part Xa in FIG. 10A.

Figure 12:
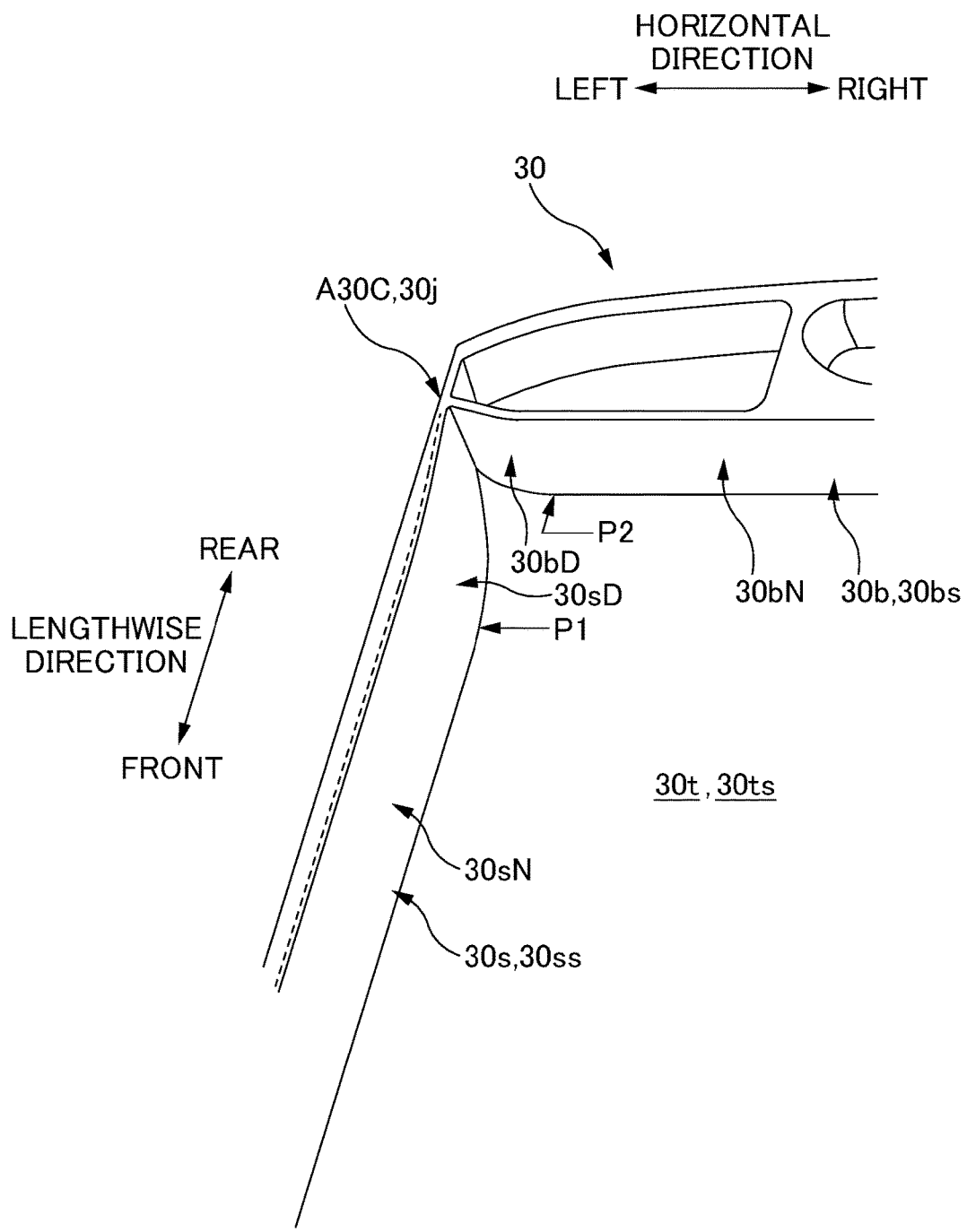
FIG. 12 is a schematic perspective view of part Xa in FIG. 10A.

As illustrated in FIGS. 11A and 12, firstly, a horizontal wall displaced part 30*b*D where the horizontal wall 30*b* is displaced outward in the lengthwise direction at the horizontal end part of the horizontal wall 30*b* and a lengthwise wall displaced part 30*s*D where the lengthwise wall 30*s* is displaced outward in the horizontal direction at the lengthwise end part of the lengthwise wall 30*s*, are formed to correspond to the above described corner part A30C in the placing area A30. And hereby, at the above described corner part A30C of the placing area A30, the bottom face 30*ts* of the bottom face wall 30*t* is expanded outside in the lengthwise direction and outside in the horizontal direction.

Therefore, the bending action applied from both the horizontal and the lengthwise directions to the corner part 50C of the absorbent sheet 50 can be relieved based on the horizontal wall displaced part 30*b*D and the lengthwise wall displaced part 30*s*D, and hereby the standing of the corner part 50C of the absorbent sheet 50 can be controlled. And as a result, the corner part 50C can be restrained from protruding out excessively upward.

Further in this example, as illustrated in FIG. 11A, this horizontal wall displaced part 30*b*D is made to be gradually displaced outward in the lengthwise direction while approaching the outer side in the horizontal direction and similarly, the lengthwise wall displaced part 30*s*D is made to be gradually displaced outward in the horizontal direction while approaching the outer side in the lengthwise direction.

Therefore, the bending actions applied to the corner part 50C of the absorbent sheet 50 in both the horizontal and lengthwise directions can be smoothly relieved based on the gentle displacements as described above. And hereby, the standing of this corner part 50C can be smoothly restrained and as a result, an excessive upward protrusion of this corner part 50 can be quickly restrained.

Further, in this example, the joining part 30*j* of the horizontal wall displaced part 30*b*D with the lengthwise wall displaced part 30*s*D is positioned outside in the lengthwise direction with respect to the section 30*b*N excluding the horizontal wall displaced part 30*b*D of the horizontal wall 30*b* and is positioned outside in the horizontal direction with respect to the section 30*s*N excluding the lengthwise wall displaced part 30*s*D of the lengthwise wall 30*s*, as well. Therefore, the above described restraining effect on the corner part 50C from protruding excessively upward can be certainly exhibited.

And as mentioned above, in this example, the horizontal wall displaced part 30*b*D and the lengthwise wall displaced part 30*s*D are provided to each of all the four corner parts A30C, A30*c* . . . of the placing area A30, however, it is not limited to such. In other words, when at least one corner part A30C is provided therewith, this corner part A30C can have the corner part 50C of the absorbent sheet 50 restrained from protruding upward and an unintended lengthwise relative movement of the absorbent sheet 50 can be controlled through restraining this corner part 50C from getting caught on the insert hole 20*fh* and the like. For such reason, providing the above described horizontal wall displaced part 30*b*D and the lengthwise wall displaced part 30*s*D to at least a single corner part A30C will do. However, it is obvious that it is preferable that a plurality of the corner parts A30C, A30C . . . are provided the horizontal wall displaced part 30*b*D and the lengthwise wall displaced part 30*s*D rather than a single corner part A30C.

Further in this example, as illustrated in FIG. 11A, a predetermined area including the displacement starting position P2 where the horizontal wall displaced part 30*b*D starts to be displaced outward along the lengthwise direction has this horizontal wall displaced part 30*b*D displaced to come along an arc curve, and further, a predetermined area including the displacement starting position P1 where the lengthwise wall displaced part 30*s*D starts to be displaced outward along the horizontal direction has this lengthwise wall displaced part 30*s*D displaced to come along an arc curve.

Therefore, the changes in the bending state of the absorbent sheet 50 that may be caused between the horizontal wall displaced part 30*b*D and its proximate sections can be made continuously and gradually. Hereby, the separation of the horizontal side part 50X of the absorbent sheet 50 from the inner wall face 30*bs* of the horizontal wall 30*b* and the separation of the lengthwise side part 50Y of the absorbent sheet 50 from the inner wall face 30*ss* of the lengthwise wall 30*s* which may occur when the above changes is large, can be restrained. And as a result, the horizontal side part 50X and the lengthwise side part 50Y can be certainly made to come into contact with the inner wall face 30*bs* of the horizontal wall 30*b* and the inner wall face 30*ss* of the lengthwise wall 30*s*, respectively.

Here the length L30*b*D of the horizontal wall displaced part 30*b*D in the horizontal direction is selected from the range of, for example, 5 mm to 40 mm and the amount of displacement of this displaced part 30*b*D in the lengthwise direction is set so that the maximum value thereof comes within, for example, 2 mm to 20 mm. Similarly, the length L30*s*D of the lengthwise wall displaced part 30*s*D in the lengthwise direction is selected from the range of, for example, 10 mm to 60 mm and the amount of displacement of this displaced part 30*s*D in the horizontal direction is set so that the maximum value thereof comes within, for example, 5 mm to 30 mm. And when set in such manners, the aforementioned effect to restrain the corner part 50C from protruding out upward can be further certainly exhibited.

Further in this example, although the length of the lengthwise wall 30*s* in the lengthwise direction is made longer than the length of the horizontal wall 30*b* in the horizontal direction due to the longitudinal direction of the absorbent sheet 50 being arranged along the lengthwise direction as mentioned above, in such a case, it is preferable that the length L30*s*D of the lengthwise wall displaced part 30*s*D in the lengthwise direction is made longer than the length L30*b*D of the horizontal wall displaced part 30*b*D in the horizontal direction as illustrated in FIG. 11A, and therefore this example is carried out in such way.

And when the above manner is adopted, the tendency of the lengthwise side part 50Y of the absorbent sheet 50 being likely to fall toward the inside can be controlled. In other words, in this example illustrated in FIG. 11A, since the length of the lengthwise wall 30*s* in the lengthwise direction is long, there is a tendency for the lengthwise side part 50Y of the absorbent sheet 50 being likely to fall toward the inside (in a direction away from the corresponding walls 30*b*, 30*s*) compared to the horizontal side part 50X, however, this example has the length L30*s*D of the lengthwise wall displaced part 30*s*D in the lengthwise direction made longer than the length L30*b*D of the horizontal wall displaced part 30*b*D in the horizontal direction. Therefore, the above described tendency of the lengthwise side part 50Y being likely to fall toward the inside can be restrained based on the above lengthwise wall displaced part 30*s*D, and hereby the lengthwise side part 50Y being longer than the horizontal side part 50X of the absorbent sheet 50 can be prevented from falling toward the inside in the horizontal direction to overlay from above on the inner side section of this sheet 50. And for such reason, a large negative effect on the urine absorbency can be prevented.

Figure 13:
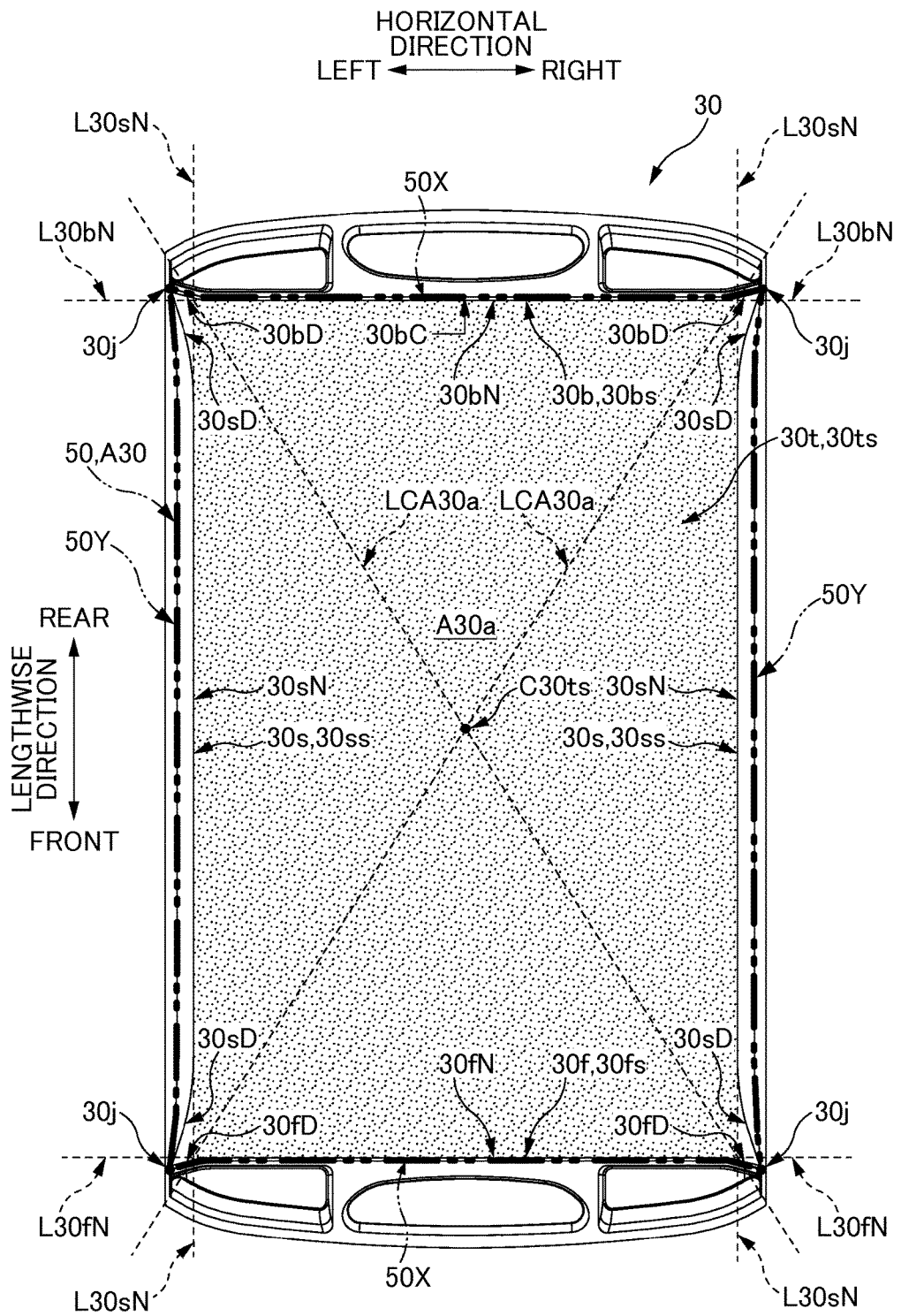
FIG. 13 is a schematic planar view for explaining a rectangular area A30a defined on the bottom face 30ts of the tray 30.

Further in this example, when the tray 30 is seen from above as in the schematic planar view in FIG. 13, the bottom face 30*ts* of the bottom face wall 30*t* of the tray 30 has a rectangular area A30*a*. In other words, as indicated in a dotted pattern in FIG. 13, this rectangular area A30*a* is partitioned by the section 30*b*N (30*f*N) of the horizontal wall 30*b* (30*f*) excluding the horizontal wall displaced part 30*b*D (30*f*D), and the extended line L30*b*N (L30*f*N) extending therefrom, and by the section 30*s*N of each of the lengthwise walls 30*s* excluding the lengthwise wall displaced part 30*s*D, and the extended line L30*s*N extending therefrom. However, the above described joining part 30*j* is located closer to the lengthwise wall 30*s* than the diagonal line LCA30*a* of this rectangular area A30*a*.

And according to this positional relationship, the aforementioned lengthwise side part 50Y can be further effectively prevented from falling toward the inside. In other words, the lengthwise side part 50Y is likely to fall toward the inside in the horizontal direction than the horizontal side part 50X falling toward the inside in the lengthwise direction when the above described joining part 30*j* is located closer to the horizontal wall 30*b* (30*f*) than the above described diagonal line LCA30*a*, and on the other hand, the horizontal side part 50X is likely to fall toward the inside in the lengthwise direction than the lengthwise side part 50Y falling toward the inside in the horizontal direction when the above described joining part 30*j* is located closer to the lengthwise wall 30*s* than the above described diagonal line LCA30*a*, and this example employs the latter positional relationship. For such reason, the lengthwise side part 50Y which is longer than the horizontal side part 50X of the absorbent sheet 50 can be prevented from falling toward the inside in the horizontal direction to overlay form above on the inner side section of this sheet 50 so that a large negative effect on the urine absorbency can be prevented further effectively.

Further in this example, as illustrated in FIG. 11B, the inner wall face 30*bs* of the horizontal wall 30*b* is inclined based on an inclination angle θ30*bs* of the horizontal wall 30*b* so that the upper part in the up-down direction thereof is positioned on the outer side in the lengthwise direction than the lower part thereof. And similarly, as illustrated in FIG. 11C, the inner wall face 30*ss* of the lengthwise wall 30*s* is inclined based on an inclination angle of θ30*ss* of the lengthwise wall 30*s* so that the upper part in the up-down direction thereof is positioned on the outer side in the horizontal direction than the lower part thereof. And the maximum value of the former inclination angle θ30*bs* of the horizontal wall 30*b* is set smaller than the maximum value of the latter inclination angle of θ30*ss* of the lengthwise wall 30*s*. In other words, the inner wall face 30*bs* of the horizontal wall 30*b* is generally in a state standing upright compared to the inner wall face 30*ss* of the lengthwise wall 30*s*.

Therefore, this horizontal wall 30*b* can effectively prevent the absorbent sheet 50 from moving relative to the tray 30 in the lengthwise direction due to the inertial force of the absorbent sheet 50 itself when the tray 30 is pulled out or when the tray 30 is pushed in.

From the viewpoint of improving this operation and effect, it is preferable that the average value of the inclination angles of θ30*bs* of the horizontal wall 30*b* is made smaller than the average value of the inclination angles of θ30ss of the lengthwise wall 30s. Further, it is preferable that the inclination angle of θ30bs of the horizontal wall 30b is set in the range of, for example, 0 degrees to 5 degrees, and the inclination angle of θ30ss of the lengthwise wall 30s is set in the range of, for example 2 degrees to 40 degrees.

Further in this example of FIG. 13, the inclination angle of θ30bs of the inner wall face 30bs in the horizontal wall displaced part 30bD is set to a value same as that of the inclination angle of θ30ss of the inner wall face 30bs at the center part 30bC of the horizontal wall 30b in the horizontal direction.

And when set in the above manner, the horizontal wall 30b can exhibit a restraining effect on the relative movement of the absorbent sheet 50 at the end parts in the horizontal direction similar to that at the center part 30bC. And hereby, the absorbent sheet 50 can be effectively prevented from relatively moving in a direction toward the corner part A30C of the placing area A30, that is, the direction between the horizontal and the lengthwise directions.

Further, from the viewpoint of the above described restraining the absorbent sheet 50 from relatively moving toward the direction of the corner part A30C, it is preferable that the joining part 30j of the horizontal wall displaced part 30bD with the lengthwise wall displaced part 30sD extends along the direction parallel to the direction orthogonal to the planar center position C30ts in the bottom face 30ts of the bottom face wall 30t of the tray 30. In other words, when arranged in such a manner, the direction in which this joining part 30j extends is substantially orthogonal to the direction parallel with the bottom face 30ts of the bottom face wall 30t so that this joining part 30j can securely receive the absorbent sheet 50 which relatively moves toward the corner part A30C along the above described bottom face 30ts. And hereby, the relative movement of the absorbent sheet 50 toward the corner part A30C can be certainly controlled.

Figure 14:
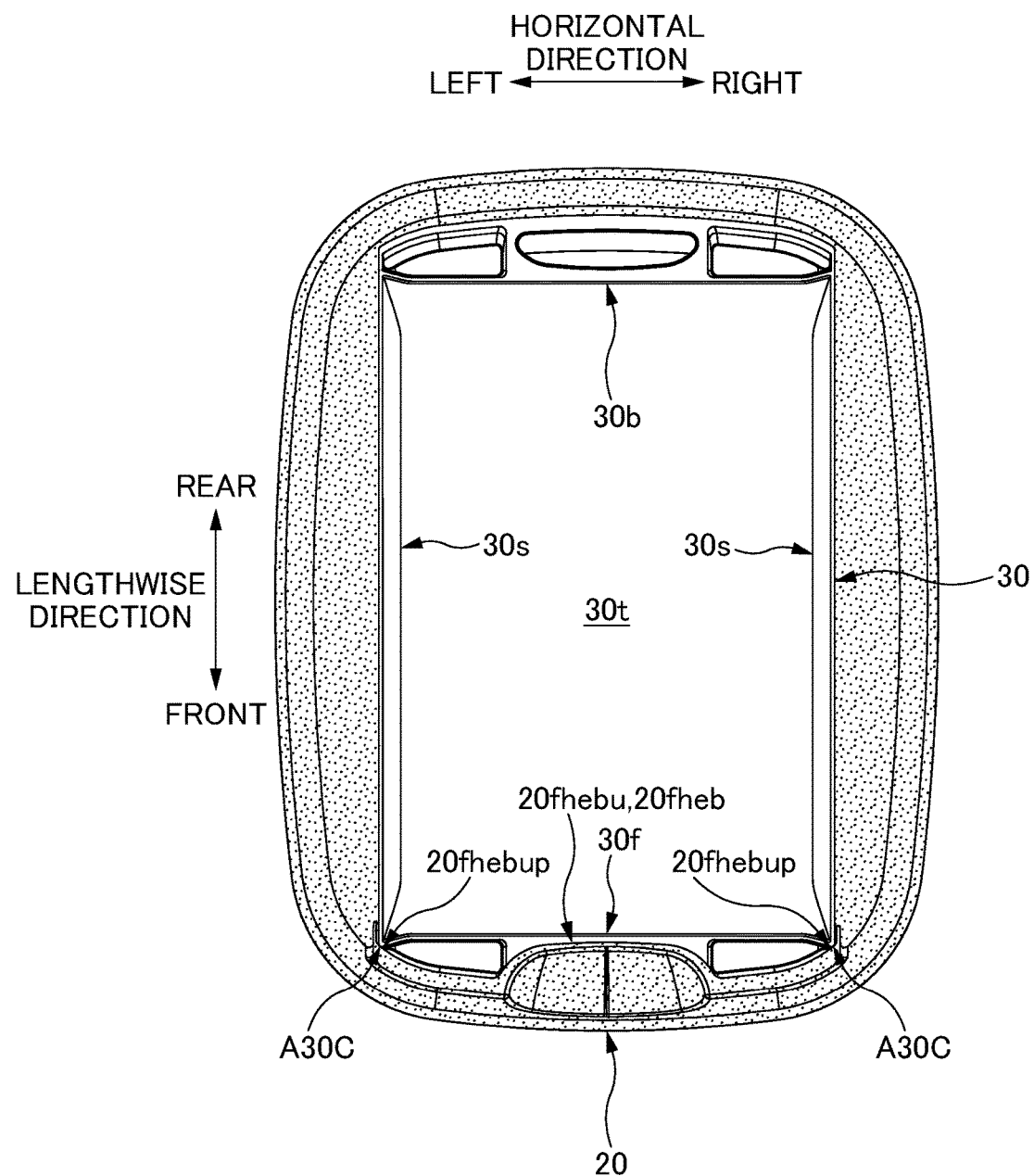
FIG. 14 is a schematic planar view of the lower container 20 housing the tray 30.

FIG. 14 is a schematic planar view of the lower container 20 housing the tray 30. In this FIG. 14, the lower container 20 is illustrated as the dotted area. In this example, when the upper part 20fhebu of the edge part 20fheb positioned in the lower container 20, of the insert hole 20fh provided to the lower container 20 is seen from above, the section 20fhebup, in this upper part 20fhebu, corresponding to the above described corner part A30C of the tray 30 includes a section in an arc curve shape as an example of the curved shape.

Therefore, when the tray 30 is pulled out from the lower container 20, even if the above described section 20fhebup in relation with the above described edge part 20fheb comes into contact with the corner part 50C of the absorbent sheet 50, this section 20fhebup would gradually come into contact with this corner part 50C. So that hereby, the external force acting, in the lengthwise direction from the above described upper part 20fhebu of the edge part 20fheb of the insert hole 20fh through the above described corner part 50C, on the absorbent sheet 50 can be relieved. And as a result, an unintended relative movement of the absorbent sheet 50 in the lengthwise direction with regard to the tray 30 can be controlled.

By the way, although polyolefin base thermoplastic resin such as polyethylene, polypropylene, polyethylene terephthalate and the like can be given as examples of the material used for the upper container 10, the lower container 20, the tray 30 and the cover 40, it is not limited to such. For example, resin other than the above may do or metal plates such as stainless steel plates, aluminum plates and the like may do.

===Other Embodiments===

Hereinabove, embodiments of the present invention have been described, however, the foregoing embodiments are intended to facilitate the understanding of the present invention but not to limit the invention. And it is needless to say that modifications and improvements inner wall face 30bs of the present invention are possible without departing from the scope of the invention, and equivalents thereof are also encompassed by the invention. For example, the following modifications are possible.

In the aforementioned embodiment, the animal toilet 1 included a cover 40, however, it is not limited to such and the cover 40 may be eliminated.

In the aforementioned embodiment, the particulate matters such as cat litter was placed on the bottom face part 10t of the upper container 10, however, it is not limited to such and the particulate matters may be eliminated.

Figure 15:
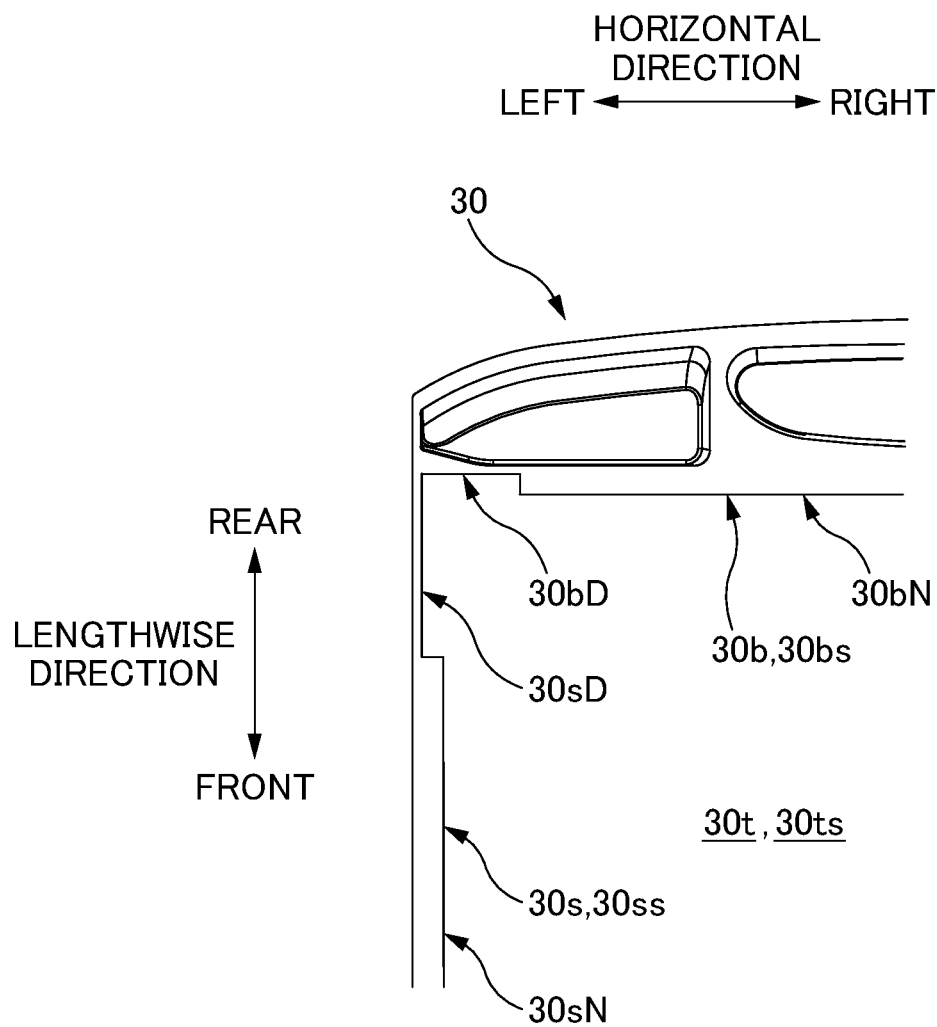
FIG. 15 is a schematic enlarged planar view illustrating the horizontal wall displaced part 30bD and the lengthwise wall displaced part 30sD according to another embodiment.

In the aforementioned embodiment, the horizontal wall displaced part 30bD was shown to be in a shape curved in the lengthwise direction as an example and the lengthwise wall displaced part 30sD was shown to be in a shape curved in the horizontal direction as an example as shown in FIG. 11A, however, it is not limited to such. For example, the horizontal wall displaced part 30bD and the lengthwise wall displaced part 30sD maybe formed as illustrated in the schematic enlarged planar view in FIG. 15. In other words, in the example in FIG. 15, the end part of the horizontal wall 30b has formed a part 30bD displaced in a stepwise manner outward along the lengthwise direction as the horizontal wall displaced part 30bD of a single step, and the end part of the lengthwise wall 30s has formed a part 30sD displaced in a stepwise manner outward along the horizontal direction as the lengthwise wall displaced part 30sD of a single step. And the standing of the corner part 50C of the absorbent sheet 50 can be controlled also in this way. By the way, the number of steps of the parts 30bD, 30sD in stepwise manners is not limited to one. In other words, there may be a case where one or both of the parts 30bD, 30sD are formed in stepwise manners including a plurality of steps and hereby the parts 30bD, 30sD are displaced outward along the lengthwise direction or outward along the horizontal direction in stepwise manners.

In the aforementioned embodiment as illustrated in FIG. 7A, the shape of the above described corner part A30C of the tray 30 was sharp, however, it is not limited to such. For example, the shape of the corner part A30C may in a round shape with a predetermined curvature and the like or may be in a polygonal shape.

REFERENCE SIGNS LIST 1 animal toilet, 10 upper container, 10t bottom face part, 10tf surrounding area, 10tfd ramp part, 10tb surrounding area, 10ts surrounding area, 10tm mesh area, 20 lower container, 20f front wall, 20fh insert hole, 20fheb edge part, 20fhebu upper part, 20fhebup section corresponding to corner part, 20fk concave face, 20b rear wall, 20s side wall, 20t bottom face wall, 20th opening part, 30 tray, 30f front horizontal wall (horizontal wall), 30fs inner wall face, 30fg handle part (section), 30fk recessed part, 30b rear horizontal wall (horizontal wall), 30bs inner wall face, 30bd horizontal wall displaced part, 30bN section excluding horizontal wall displaced part, 30bC center part, 30bg handle part, 30s right side lengthwise wall (lengthwise wall), 30s left side lengthwise wall (lengthwise wall) , 30ss inner wall face, 30sD lengthwise wall displaced part, 30sN section excluding lengthwise wall displaced part, 30j joining part, 30t bottom face wall, 30ts bottom face, 40 cover, 40h entrance/exit opening part, 50 absorbent sheet, 50C corner part, 50X horizontal side part (short side part), 50XN section excluding corner part, 50Y lengthwise side part (long side part), 50YN section excluding corner part, 50f flap part, 51 top sheet, bottom sheet, 53 absorbent body, h through hole, A30 placing area, A30C corner part, A30a rectangular area, P1 displacement starting position, P2 displacement starting position, C10t plane center position, C10tm plane center position, C30ts plane center position, CL1 center line, CL2 center line, L30bN extended line, L30sN extended line, LCA30a diagonal line

The invention claimed is:

1. An animal toilet having a lengthwise direction, a horizontal direction and an up-down direction that intersect each other comprising:
    an upper container that is provided with a plurality of holes through which urine passes below;
    a lower container that is positioned below the upper container and has formed an insert hole on a front face along the lengthwise direction;
    a tray that is housed from the insert hole into the lower container in a manner being allowed to be pulled out forward; and
    an absorbent sheet that is placed on a bottom face of the tray and receives and absorbs the urine that falls through the holes of the upper container,
    the tray including a pair of horizontal walls being provided along the horizontal direction and standing upward from the bottom face at both lengthwise ends, and a pair of lengthwise walls being provided along the lengthwise direction and standing upward from the bottom face at both horizontal ends, in order to section a placing area of the absorbent sheet, and
    a horizontal wall displaced part, having the horizontal wall displaced outward along the lengthwise direction, being formed at a horizontal end part of the horizontal wall and a lengthwise wall displaced part, having the lengthwise wall displaced outward along the horizontal direction, being formed at a lengthwise end part of the lengthwise wall, in a manner corresponding to at least one corner part of four corner parts of the placing area,
    the horizontal wall displaced part being displaced outward along the lengthwise direction while approaching an outer side along the horizontal direction,
    the lengthwise wall displaced part being displaced outward along the horizontal direction while approaching an outer side along the lengthwise direction,
    a joining part of the horizontal wall displaced part with the lengthwise wall displaced part being positioned on an outer side along the lengthwise direction from a section of the horizontal wall excluding the horizontal wall displaced part as well as being positioned on an outer side along the horizontal direction from a section of the lengthwise wall excluding the lengthwise wall displaced part,
    an inner wall face of the horizontal wall being inclined based on an inclination angle of the horizontal wall so that an upper part along an up-down direction is positioned on an outer side along the lengthwise direction,
    an inner wall face of the lengthwise wall being inclined based on an inclination angle of the lengthwise wall so that an upper part along the up-down direction is positioned on an outer side along the horizontal direction,
    a maximum value of the inclination angle of the inner wall face of the horizontal wall is smaller than a maximum value of the inclination angle of the inner wall face of the lengthwise wall,
    the tray having a shape that has a side that is longer along the lengthwise direction than a side along the horizontal direction,
    the tray being allowed to be housed in the lower container with either sides of the lengthwise ends facing a front, and
    the horizontal wall displaced part and the lengthwise wall displaced part being provided to all corner parts of the four corner parts of the placing area.

2. An animal toilet according to claim 1, wherein
the inclination angle at the horizontal wall displaced part is of a same value as
the inclination angle at a horizontal center part of the horizontal wall.

3. An animal toilet according to claim 2, wherein
the horizontal wall is displaced along an arc curve in a predetermined area including a position, of the horizontal wall displaced part, where a displacement toward an outer side along the lengthwise direction starts and
the lengthwise wall is displaced along an arc curve in a predetermined area including a position, of the lengthwise wall displaced part, where a displacement toward an outer side along the horizontal direction starts.

4. An animal toilet according to claim 3, wherein
a length of the lengthwise wall along the lengthwise direction is longer than a length of the horizontal wall along the horizontal direction,
the absorbent sheet has a long side part that is along a longitudinal direction and a short side part that is along a width direction, the short side part having a length shorter than the long side part, and the absorbent sheet is placed on the tray with the longitudinal direction made to come along the lengthwise direction and the width direction made to come along the horizontal direction, and
a length of the lengthwise wall displaced part in the lengthwise direction is longer than a length of the horizontal wall displaced part in the horizontal direction.

5. An animal toilet according to claim 4, wherein
when an upper part of an edge part, positioned in the lower container, of the insert hole of the lower container is seen from above, a section corresponding to the corner part of the tray in the upper part has a section in a curved shape.

6. An animal toilet according to claim 3, wherein
when an upper part of an edge part, positioned in the lower container, of the insert hole of the lower container is seen from above, a section corresponding to the corner part of the tray in the upper part has a section in a curved shape.

7. An animal toilet according to claim 2, wherein
a length of the lengthwise wall along the lengthwise direction is longer than a length of the horizontal wall along the horizontal direction,
the absorbent sheet has a long side part that is along a longitudinal direction and a short side part that is along a width direction, the short side part having a length shorter than the long side part, and the absorbent sheet is placed on the tray with the longitudinal direction made to come along the lengthwise direction and the width direction made to come along the horizontal direction, and a length of the lengthwise wall displaced part in the lengthwise direction is longer than a length of the horizontal wall displaced part in the horizontal direction.

8. An animal toilet according to claim 7, wherein when an upper part of an edge part, positioned in the lower container, of the insert hole of the lower container is seen from above, a section corresponding to the corner part of the tray in the upper part has a section in a curved shape.

9. An animal toilet according to claim 2, wherein when an upper part of an edge part, positioned in the lower container, of the insert hole of the lower container is seen from above, a section corresponding to the corner part of the tray in the upper part has a section in a curved shape.

10. An animal toilet according to claim 1, wherein the horizontal wall is displaced along an arc curve in a predetermined area including a position, of the horizontal wall displaced part, where a displacement toward an outer side along the lengthwise direction starts and the lengthwise wall is displaced along an arc curve in a predetermined area including a position, of the lengthwise wall displaced part, where a displacement toward an outer side along the horizontal direction starts.

11. An animal toilet according to claim 10, wherein a length of the lengthwise wall along the lengthwise direction is longer than a length of the horizontal wall along the horizontal direction, the absorbent sheet has a long side part that is along a longitudinal direction and a short side part that is along a width direction, the short side part having a length shorter than the long side part, and the absorbent sheet is placed on the tray with the longitudinal direction made to come along the lengthwise direction and the width direction made to come along the horizontal direction, and a length of the lengthwise wall displaced part in the lengthwise direction is longer than a length of the horizontal wall displaced part in the horizontal direction.

12. An animal toilet according to claim 11, wherein when an upper part of an edge part, positioned in the lower container, of the insert hole of the lower container is seen from above, a section corresponding to the corner part of the tray in the upper part has a section in a curved shape.

13. An animal toilet according to claim 10, wherein when an upper part of an edge part, positioned in the lower container, of the insert hole of the lower container is seen from above, a section corresponding to the corner part of the tray in the upper part has a section in a curved shape.

14. An animal toilet according to claim 1, wherein a length of the lengthwise wall along the lengthwise direction is longer than a length of the horizontal wall along the horizontal direction, the absorbent sheet has a long side part that is along a longitudinal direction and a short side part that is along a width direction, the short side part having a length shorter than the long side part, and the absorbent sheet is placed on the tray with the longitudinal direction made to come along the lengthwise direction and the width direction made to come along the horizontal direction, and a length of the lengthwise wall displaced part in the lengthwise direction is longer than a length of the horizontal wall displaced part in the horizontal direction.

15. An animal toilet according to claim 14, wherein when an upper part of an edge part, positioned in the lower container, of the insert hole of the lower container is seen from above, a section corresponding to the corner part of the tray in the upper part has a section in a curved shape.

16. An animal toilet according to claim 1, wherein the joining part extends along a direction parallel to a direction orthogonal to a planar center position in the bottom face of the tray.

17. An animal toilet according to claim 16, wherein when an upper part of an edge part, positioned in the lower container, of the insert hole of the lower container is seen from above, a section corresponding to the corner part of the tray in the upper part has a section in a curved shape.

18. An animal toilet according to claim 1, wherein a length of the lengthwise wall along the lengthwise direction is longer than a length of the horizontal wall along the horizontal direction, the absorbent sheet has a long side part that is along a longitudinal direction and a short side part that is along a width direction, the short side part having a length shorter than the long side part, and the absorbent sheet is placed on the tray with the longitudinal direction made to come along the lengthwise direction and the width direction made to come along the horizontal direction, the bottom face of the tray has a rectangular area when seen from above, the rectangular area is an area sectioned by two sets of sections of the horizontal walls excluding the horizontal wall displaced parts and extended lines extending from the sections of the horizontal walls excluding the horizontal wall displaced parts, and sections of the lengthwise walls excluding the lengthwise wall displaced parts and extended lines extending from the sections of the lengthwise walls excluding the lengthwise wall displaced parts, and the joining part is positioned closer to the lengthwise wall side than a diagonal line of the rectangular area.

19. An animal toilet according to claim 18, wherein when an upper part of an edge part, positioned in the lower container, of the insert hole of the lower container is seen from above, a section corresponding to the corner part of the tray in the upper part has a section in a curved shape.

20. An animal toilet according to claim 1, wherein when an upper part of an edge part, positioned in the lower container, of the insert hole of the lower container is seen from above, a section corresponding to the corner part of the tray in the upper part has a section in a curved shape.

* * * * *

UNITED STATES PATENT AND TRADEMARK OFFICE
CERTIFICATE OF CORRECTION

PATENT NO. : 10,154,647 B2
APPLICATION NO. : 14/780243
DATED : December 18, 2018
INVENTOR(S) : Chiyo Takagi and Shinya Kaneko Page 1 of 1

It is certified that error appears in the above-identified patent and that said Letters Patent is hereby corrected as shown below:

On the Title Page

Item (56) in Other Publications section the PCT number should be changed from:
"PCT/JP2015/064256"

To:
--PCT/JP2015/064254--

Signed and Sealed this
Second Day of April, 2019

Andrei Iancu
*Director of the United States Patent and Trademark Office*